US012587346B2

(12) United States Patent
Tsujimaru

(10) Patent No.: US 12,587,346 B2
(45) Date of Patent: Mar. 24, 2026

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Yuki Tsujimaru, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 525 days.

(21) Appl. No.: 18/149,194

(22) Filed: Jan. 3, 2023

(65) Prior Publication Data

US 2023/0155791 A1 May 18, 2023

Related U.S. Application Data

(63) Continuation of application No. PCT/JP2021/023322, filed on Jun. 21, 2021.

(30) Foreign Application Priority Data

Aug. 4, 2020 (JP) ................................. 2020-132541

(51) Int. Cl.
| | |
|---|---|
| *H04L 5/00* | (2006.01) |
| *H04L 1/1607* | (2023.01) |
| *H04L 1/1829* | (2023.01) |

(52) U.S. Cl.
CPC .......... *H04L 5/0055* (2013.01); *H04L 1/1635* (2013.01); *H04L 1/1861* (2013.01); *H04L 5/0098* (2013.01)

(58) Field of Classification Search
CPC ... H04L 5/0055; H04L 5/0098; H04L 1/1635; H04L 1/1848; H04L 1/1861;
(Continued)

(56) References Cited

U.S. PATENT DOCUMENTS

| | | | |
|---|---|---|---|
| 8,885,621 B2 | 11/2014 | Cordeiro | |
| 10,791,572 B2 | 9/2020 | Umehara | |

(Continued)

FOREIGN PATENT DOCUMENTS

| | | |
|---|---|---|
| CN | 102238681 A | 11/2011 |
| CN | 104365169 A | 2/2015 |

(Continued)

OTHER PUBLICATIONS

Form PCT/ISA/210 issued in corresponding parent International Patent Application No. PCT/JP2021/023322 dated Sep. 21, 2021.
(Continued)

*Primary Examiner* — Vinncelas Louis
(74) *Attorney, Agent, or Firm* — Venable LLP

(57) ABSTRACT

A communication apparatus for executing communication by establishing connections with another communication apparatus using a plurality of frequency channels transmits or receives, while control communication for collectively controlling communication in the connections using at least two of the plurality of frequency channels is executed, a frame for ending the control communication to or from the other communication apparatus. The frame can include at least two fields each storing information concerning a frequency channel, use of which is stopped in the control communication.

8 Claims, 17 Drawing Sheets

| Category | Block Ack Action | DELBA Parameter Set | Reason Code | DELBA GCR Group Address | Multi-band | Multi-band | TCLAS |
|---|---|---|---|---|---|---|---|
| 1201 | 1202 | 1203 | 1204 | 1205 | 1206 | 1207 | 1208 |

(58) Field of Classification Search

CPC .... H04L 1/1896; H04L 5/0053; H04W 76/10; H04W 84/12; H04W 4/80; H04W 76/15

See application file for complete search history.

(56) References Cited

U.S. PATENT DOCUMENTS

| | | | |
|---|---|---|---|
| 2011/0261735 A1* | 10/2011 | Cordeiro | H04W 4/80 |
| | | | 370/310 |
| 2016/0302229 A1 | 10/2016 | Hedayat | |
| 2017/0006608 A1 | 1/2017 | Josiam | |
| 2017/0149547 A1 | 5/2017 | Kim | |
| 2018/0184233 A1 | 6/2018 | Alpert | |
| 2022/0014311 A1 | 1/2022 | Chitrakar et al. | |
| 2022/0132610 A1* | 4/2022 | Guo | H04W 76/15 |

FOREIGN PATENT DOCUMENTS

| EP | 2451114 A | 5/2012 |
|---|---|---|
| JP | 2011-254458 A | 12/2011 |
| JP | 2018-050133 A | 3/2018 |
| WO | 2020/013594 A1 | 1/2020 |
| WO | 2020/112020 A1 | 6/2022 |

OTHER PUBLICATIONS

Indian Office Action issued on Jul. 5, 2023 in counterpart Indian Patent Appln. No. 202347005775.

Yang et al., "AP Coordination and Full-duplex enabled Multi-band Operation for the Next Generation WLAN: IEEE 802. IIbe (EHT)," 2019 11th International Conference on Wireless Communications and Signal Processing (WCSP), IEEE, Oct. 23, 2019, pp. 1-7, XP033671823.

Extended European Search Report dated Jul. 29, 2024 in counterpart European Patent Appln. No. 21852256.

Japanese Office Action issued Jul. 29, 2024 in Japanese Application No. 2020-132541.

Communication from Indian Patent Office dated Oct. 9, 2025 in counterpart Indian Patent Application No. 202347005775.

Indian Office Action dated Sep. 11, 2025 in counterpart Indian Patent Appln. No. 202347005775.

Chinese Office Action dated Jun. 27, 2025 in counterpart Chinese Patent Appln. No. 202180057536.5, with English translation.

Korean Office Action dated Dec. 15, 2025 in counterpart Korean Patent Appln. No. 10-2023-7005840.

* cited by examiner

F I G.  1
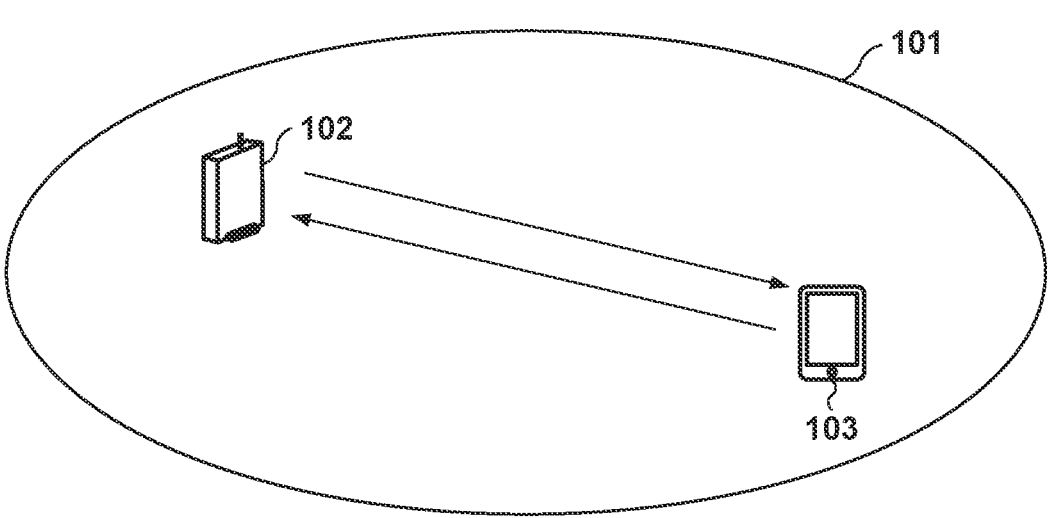
F I G.  2
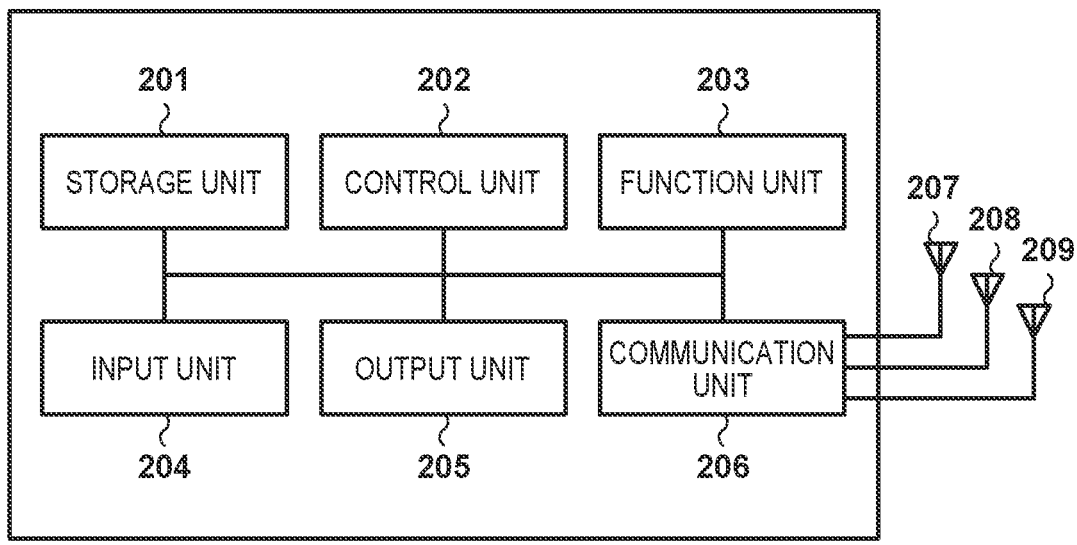

F I G. 3
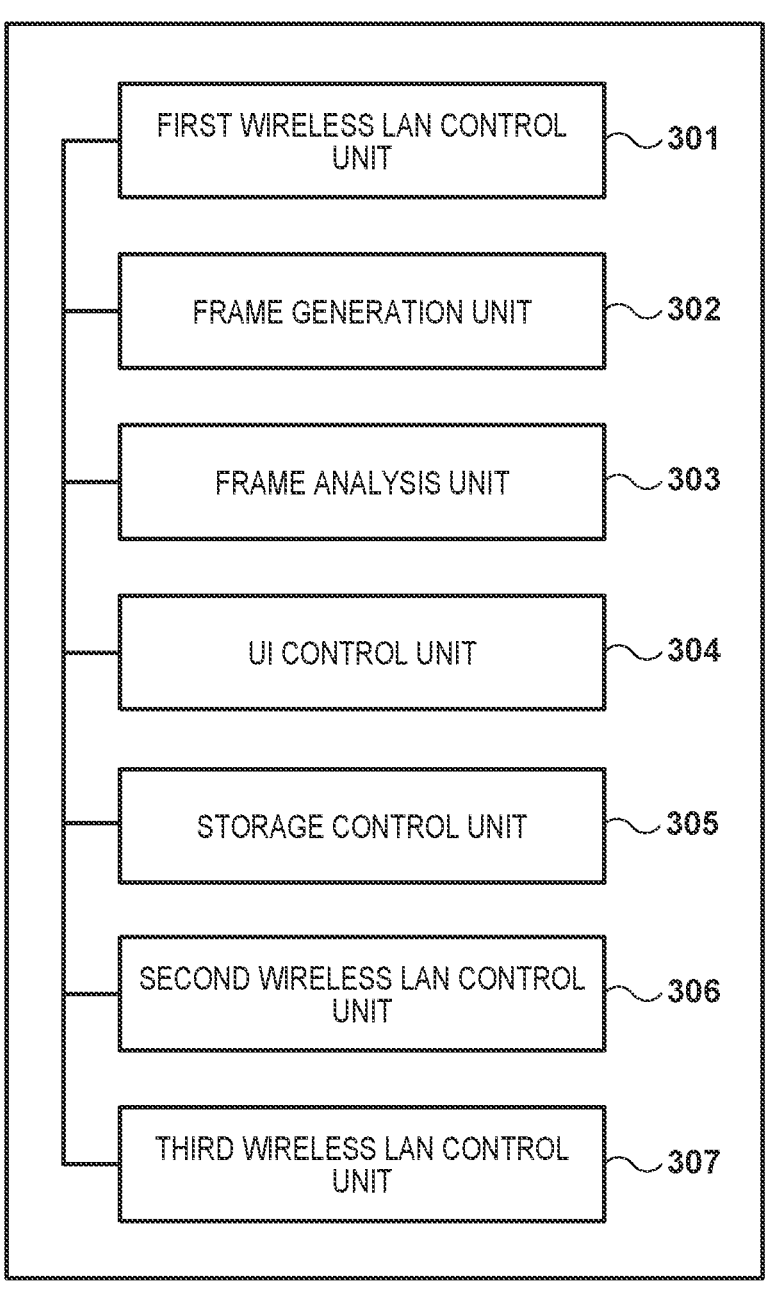
FIRST WIRELESS LAN CONTROL UNIT ~301
FRAME GENERATION UNIT ~302
FRAME ANALYSIS UNIT ~303
UI CONTROL UNIT ~304
STORAGE CONTROL UNIT ~305
SECOND WIRELESS LAN CONTROL UNIT ~306
THIRD WIRELESS LAN CONTROL UNIT ~307

F I G. 4

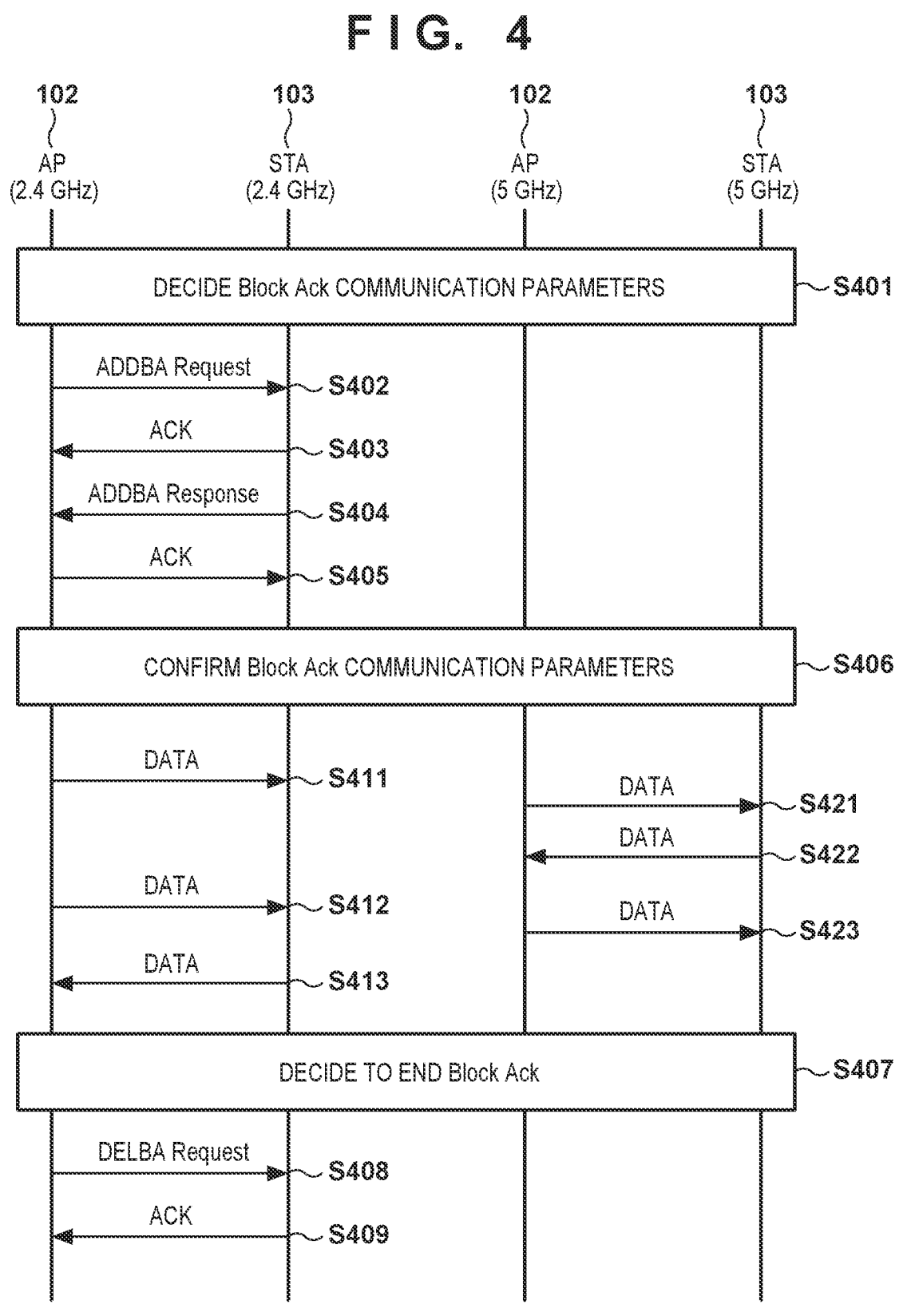

|102|103|102|103|
|:-:|:-:|:-:|:-:|
|AP<br>(2.4 GHz)|STA<br>(2.4 GHz)|AP<br>(5 GHz)|STA<br>(5 GHz)|

DECIDE Block Ack COMMUNICATION PARAMETERS    S401

ADDBA Request    S402

ACK    S403

ADDBA Response    S404

ACK    S405

CONFIRM Block Ack COMMUNICATION PARAMETERS    S406

DATA    S411

DATA    S421

DATA    S422

DATA    S412

DATA    S423

DATA    S413

DECIDE TO END Block Ack    S407

DELBA Request    S408

ACK    S409

F I G. 5
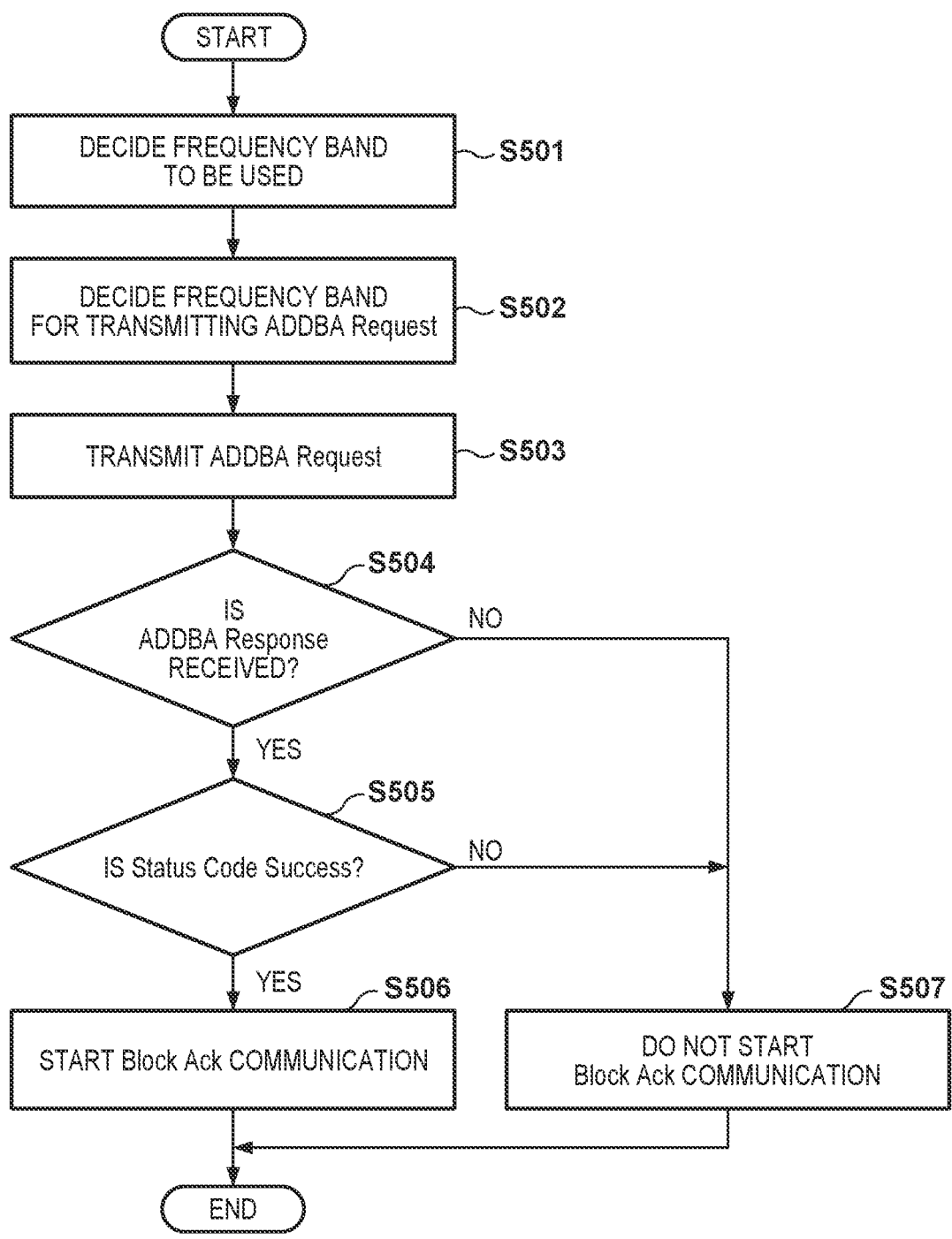

| Category | Block Ack Action | Dialog Token | Block Ack Parameter Set | Block Ack Timeout Value | Block Ack Starting Sequence Control | GCR Group Address element | Multi-band | Multi-band | TCLAS | ADDBA Extension |
|---|---|---|---|---|---|---|---|---|---|---|
| 701 | 702 | 703 | 704 | 705 | 706 | 707 | 708 | 709 | 710 | 711 |

F I G. 8
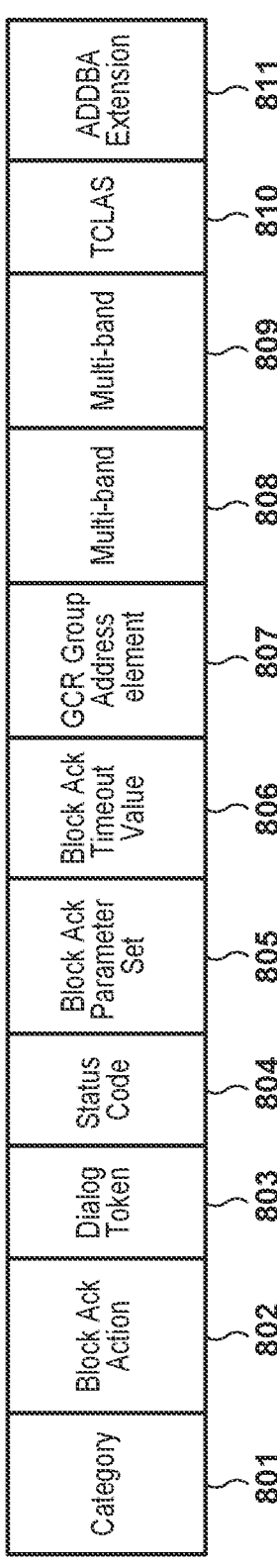
| Category | Block Ack Action | Dialog Token | Status Code | Block Ack Parameter Set | Block Ack Timeout Value | GCR Group Address element | Multi-band | Multi-band | TCLAS | ADDBA Extension |
|---|---|---|---|---|---|---|---|---|---|---|
| 801 | 802 | 803 | 804 | 805 | 806 | 807 | 808 | 809 | 810 | 811 |

F I G. 9
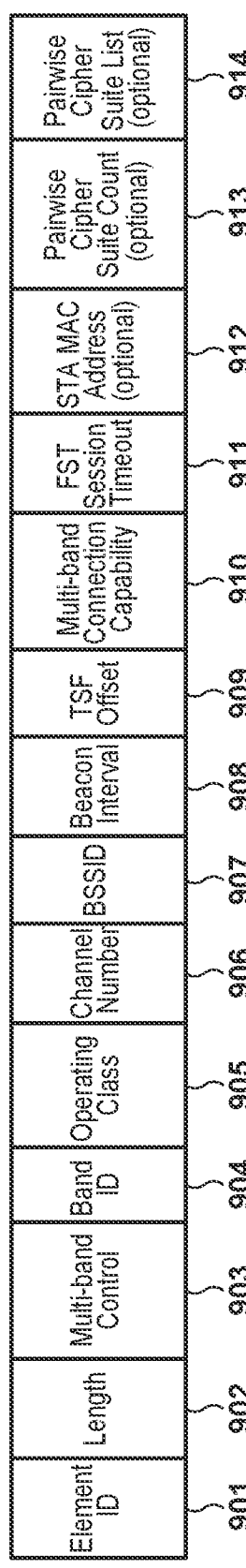
| Element ID | Length | Multi-band Control | Band ID | Operating Class | Channel Number | BSSID | Beacon Interval | TSF Offset | Multi-band Connection Capability | FST Session Timeout | STA MAC Address (optional) | Pairwise Cipher Suite Count (optional) | Pairwise Cipher Suite List (optional) |
|---|---|---|---|---|---|---|---|---|---|---|---|---|---|
| 901 | 902 | 903 | 904 | 905 | 906 | 907 | 908 | 909 | 910 | 911 | 912 | 913 | 914 |

F I G. 10
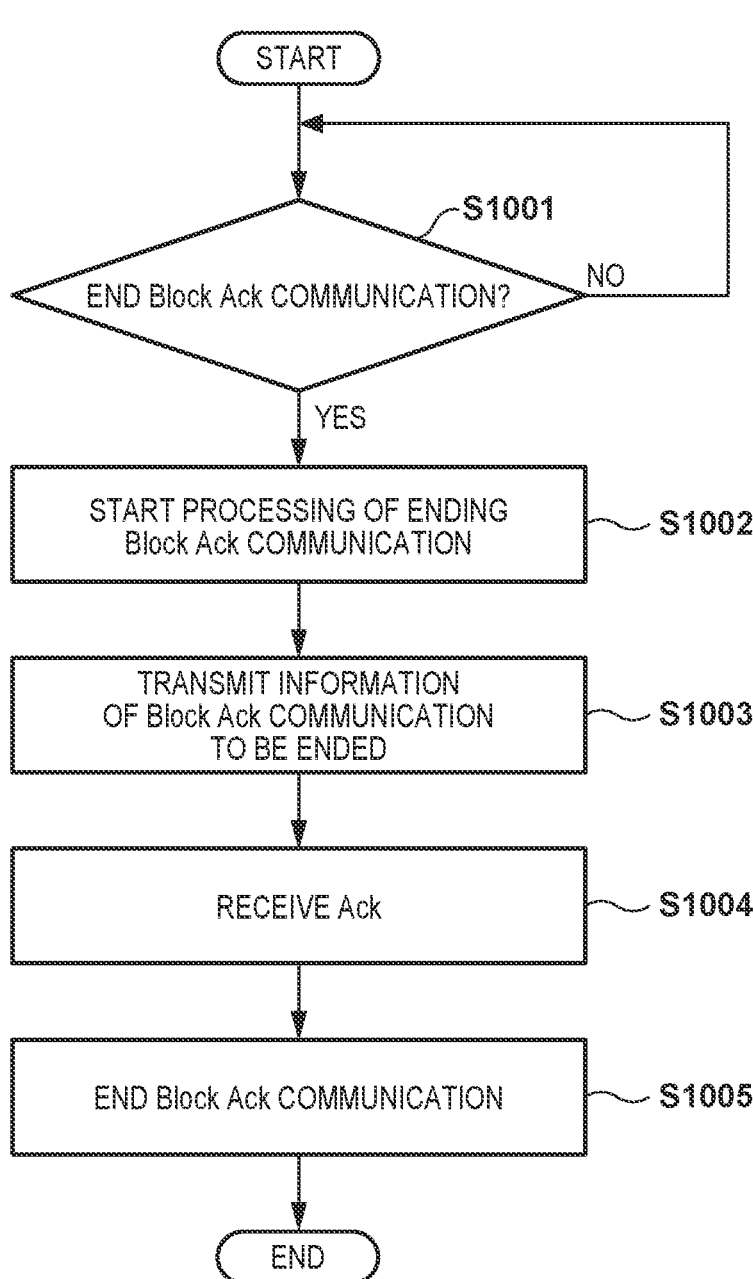

F I G. 11
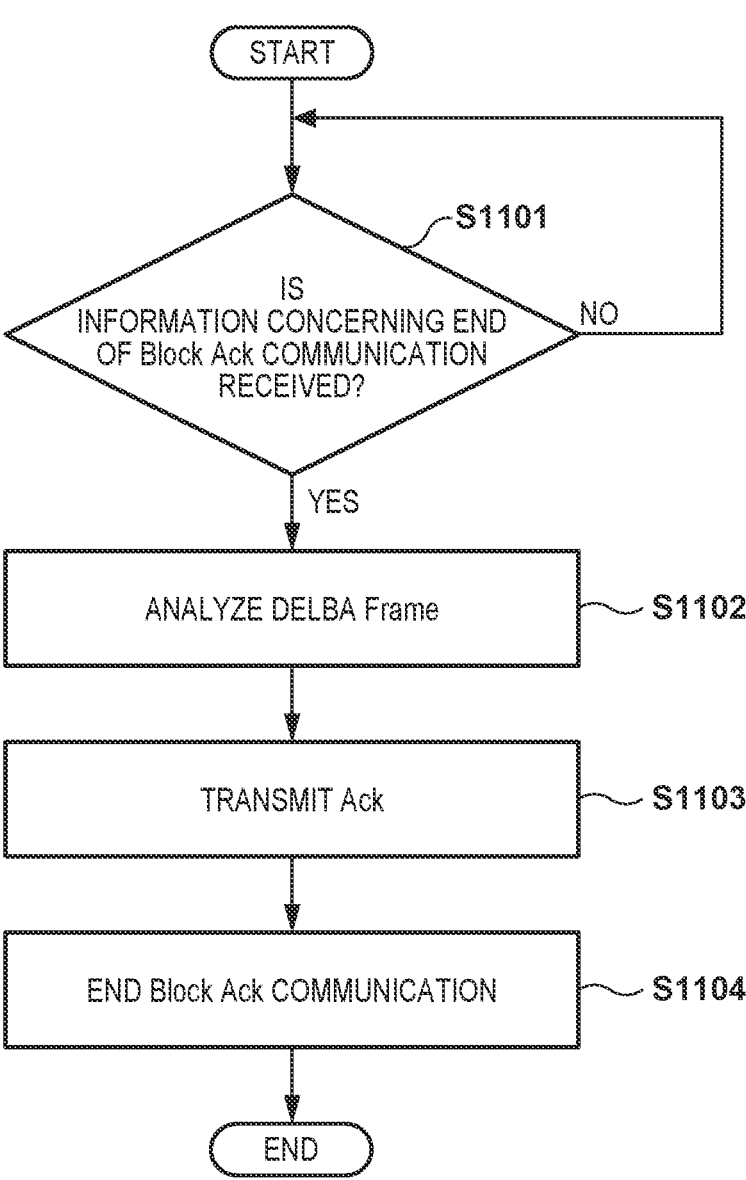

F I G.  12
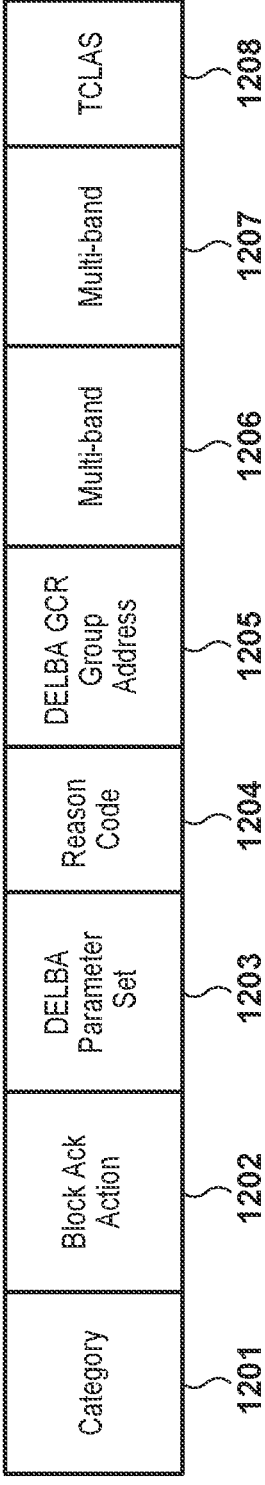
| Category | Block Ack Action | DELBA Parameter Set | Reason Code | DELBA GCR Group Address | Multi-band | Multi-band | TCLAS |
|---|---|---|---|---|---|---|---|
| 1201 | 1202 | 1203 | 1204 | 1205 | 1206 | 1207 | 1208 |

F I G.  13
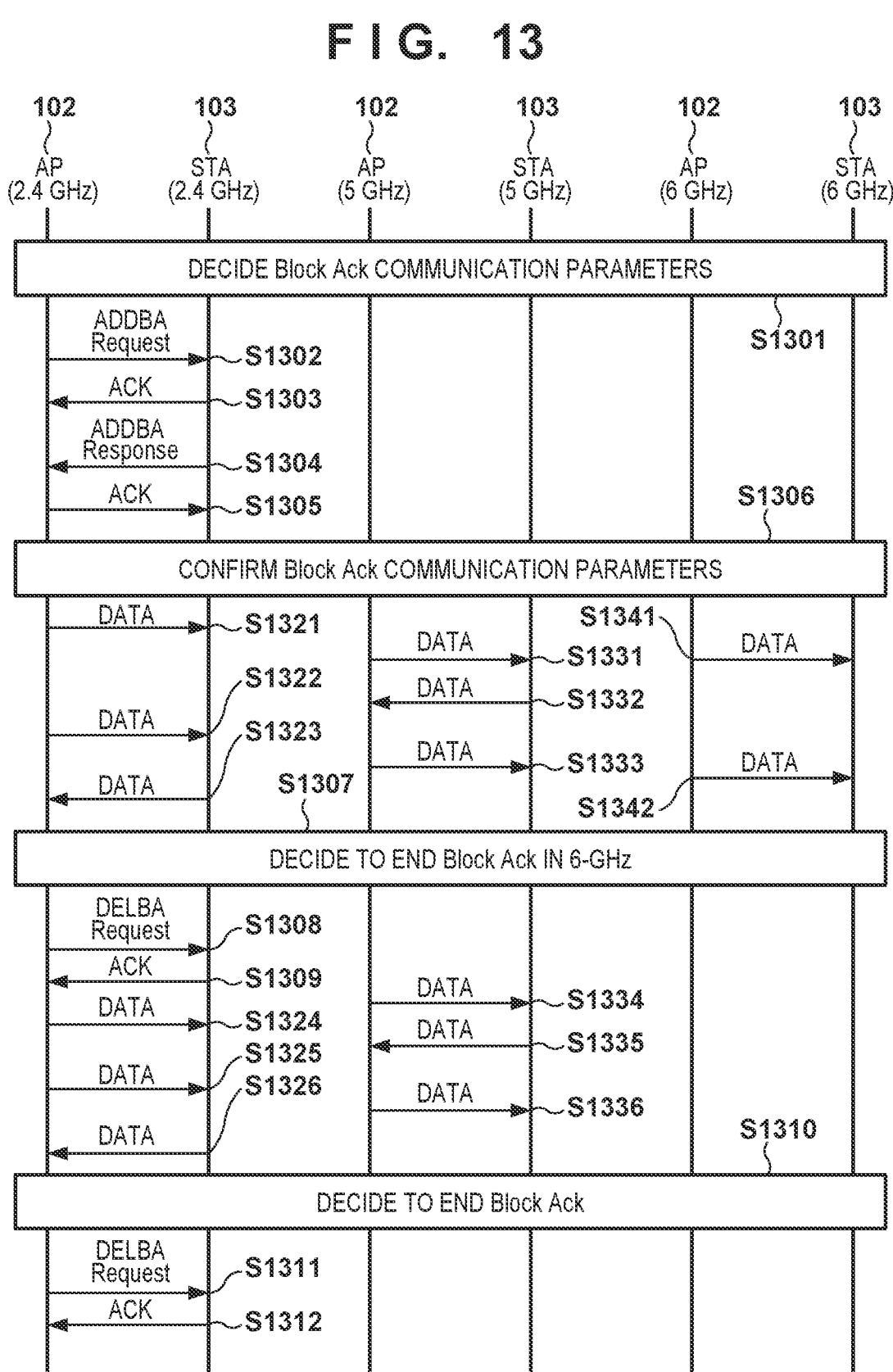

F I G.  14
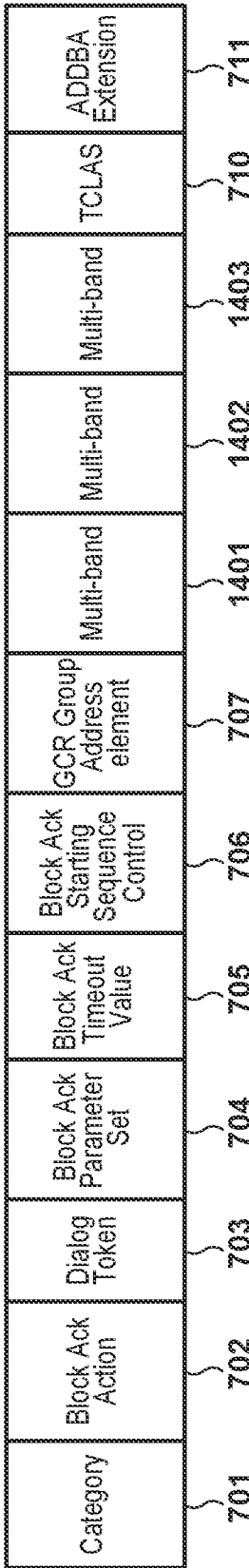
| Category | Block Ack Action | Dialog Token | Block Ack Parameter Set | Block Ack Timeout Value | Block Ack Starting Sequence Control | GCR Group Address element | Multi-band | Multi-band | Multi-band | TCLAS | ADDBA Extension |
|---|---|---|---|---|---|---|---|---|---|---|---|
| 701 | 702 | 703 | 704 | 705 | 706 | 707 | 1401 | 1402 | 1403 | 710 | 711 |

F I G.  15
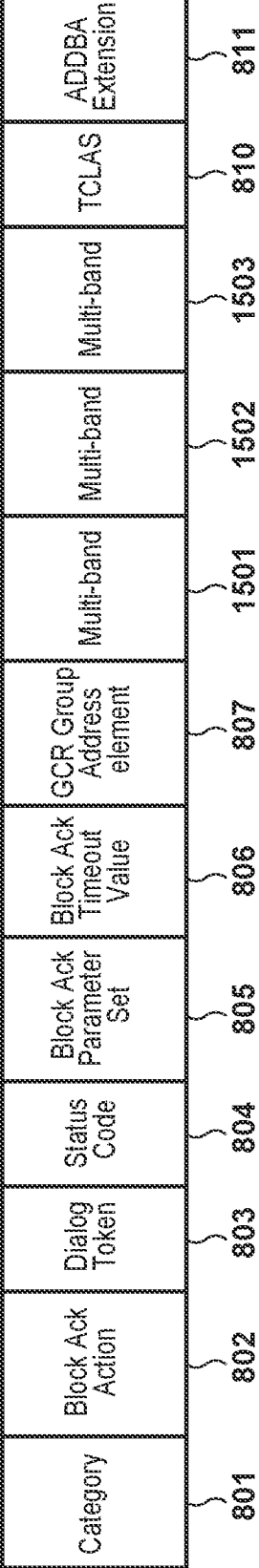
| Category | Block Ack Action | Dialog Token | Status Code | Block Ack Parameter Set | Block Ack Timeout Value | GCR Group Address element | Multi-band | Multi-band | Multi-band | TCLAS | ADDBA Extension |
|----------|------------------|--------------|-------------|-------------------------|-------------------------|---------------------------|------------|------------|------------|-------|-----------------|
| 801 | 802 | 803 | 804 | 805 | 806 | 807 | 1501 | 1502 | 1503 | 810 | 811 |

FIG. 17

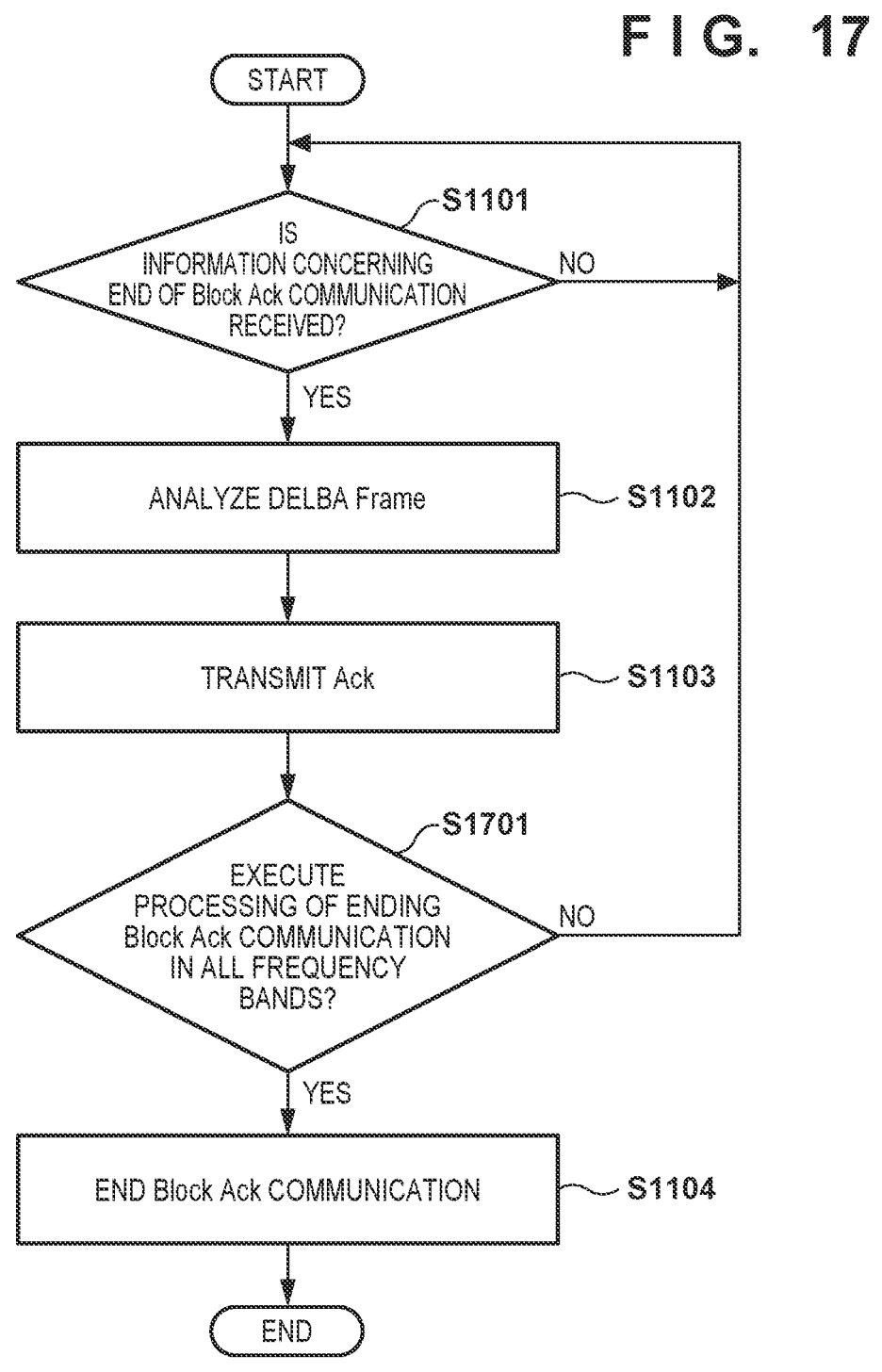

START

S1101

IS INFORMATION CONCERNING END OF Block Ack COMMUNICATION RECEIVED?

NO

YES

ANALYZE DELBA Frame ～ S1102

TRANSMIT Ack ～ S1103

S1701

EXECUTE PROCESSING OF ENDING Block Ack COMMUNICATION IN ALL FREQUENCY BANDS?

NO

YES

END Block Ack COMMUNICATION ～ S1104

END

F I G.   18
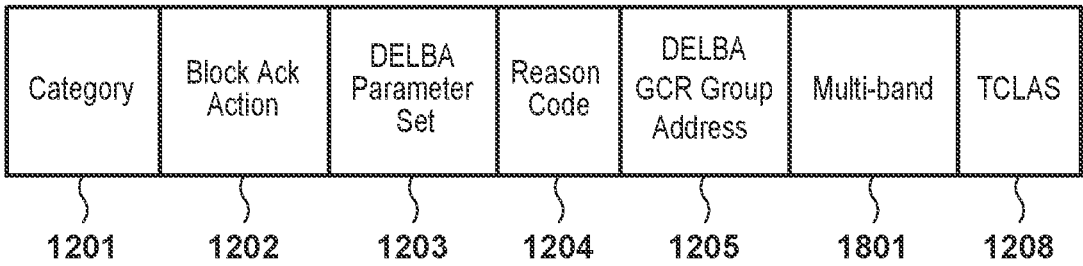
| Category | Block Ack Action | DELBA Parameter Set | Reason Code | DELBA GCR Group Address | Multi-band | TCLAS |
|---|---|---|---|---|---|---|
| 1201 | 1202 | 1203 | 1204 | 1205 | 1801 | 1208 |

1

COMMUNICATION APPARATUS, CONTROL METHOD, AND COMPUTER-READABLE STORAGE MEDIUM

CROSS-REFERENCE TO RELATED APPLICATIONS

This application is a Continuation of International Patent Application No. PCT/JP2021/023322, filed Jun. 21, 2021, which claims the benefit of Japanese Patent Application No. 2020-132541 filed Aug. 4, 2020, both of which are hereby incorporated by reference herein in their entirety.

BACKGROUND OF THE INVENTION

Field of the Invention

The present invention relates to a technique for controlling wireless communication using a plurality of frequency channels.

Background Art

As communication standards concerning a wireless local area network (LAN), Institute of Electrical and Electronics Engineers (IEEE) 802.11 standards are known. The IEEE 802.11 standards are the standard series including IEEE 802.11a/b/g/n/ac/ax standards. The IEEE 802.11ax standard as the latest standard of the IEEE 802.11 standard series implements high peak throughput using Orthogonal Frequency-Division Multiple Access (OFDMA) (see Japanese Patent Laid-Open No. 2018-050133).

Presently, to further improve the throughput, the IEEE 802.11be standard has been defined as a new standard of the IEEE 802.11 standard series. In the IEEE 802.11be standard, multi-band communication in which one access point (AP) executes communication by establishing, with one station (STA), a plurality of radio links in a plurality of frequency bands has been examined. In multi-band communication, for example, an AP establishes, with an STA, connections using a plurality of frequency channels in the 2.4-, 5-, or 6-GHz band, and communicates with the STA using the frequency channels simultaneously.

In the IEEE 802.11be standard, to further increase the communication rate in multi-band communication, Block Ack communication with respect to reception of data frames over a plurality of frequency bands has been examined. That is, a technique of transmitting/receiving an ACK with respect to communication in a plurality of radio links has been examined. When collectively controlling communication in the plurality of radio links, it is necessary to execute control to appropriately start and end the control operation.

SUMMARY OF THE INVENTION

The present invention provides a technique of appropriately executing control communication for collectively controlling communication in a plurality of radio links.

A communication apparatus according to one aspect of the present invention is a communication apparatus comprising a communication unit configured to execute communication by establishing connections with another communication apparatus using a plurality of frequency channels, wherein while control communication for collectively controlling communication in the connections using at least two of the plurality of frequency channels is executed, the communication unit transmits or receives a frame for ending the control communication to or from the other communication apparatus, and the frame can include at least two fields each storing information concerning a frequency channel, use of which is stopped in the control communication.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 1 is a view showing an example of the configuration of a network;

FIG. 2 is a block diagram showing an example of the hardware arrangement of a communication apparatus;

FIG. 3 is a block diagram showing an example of the functional arrangement of the communication apparatus;

FIG. 4 is a sequence chart showing an example of processing when executing Block Ack communication;

FIG. 5 is a flowchart illustrating an example of processing of an AP when executing Block Ack communication;

FIG. 8 is a view showing an example of the structure of an ADDBA Response frame;

FIG. 9 is a view showing an example of the structure of a Multi-band element;

FIG. 10 is a flowchart illustrating an example of processing of the AP when ending Block Ack communication;

FIG. 11 is a flowchart illustrating an example of processing of the STA when ending Block Ack communication;

FIG. 12 is a view showing an example of the structure of a DELBA frame;

FIG. 13 is a sequence chart showing an example of processing when executing Block Ack communication;

FIG. 14 is a view showing an example of the structure of an ADDBA Request frame;

FIG. 15 is a view showing an example of the structure of an ADDBA Response frame;

FIG. 17 is a flowchart illustrating an example of processing of the STA when ending Block Ack communication; and FIG. 18 is a view showing an example of the structure of a DELBA frame.

DESCRIPTION OF THE EMBODIMENTS

Figure 6:
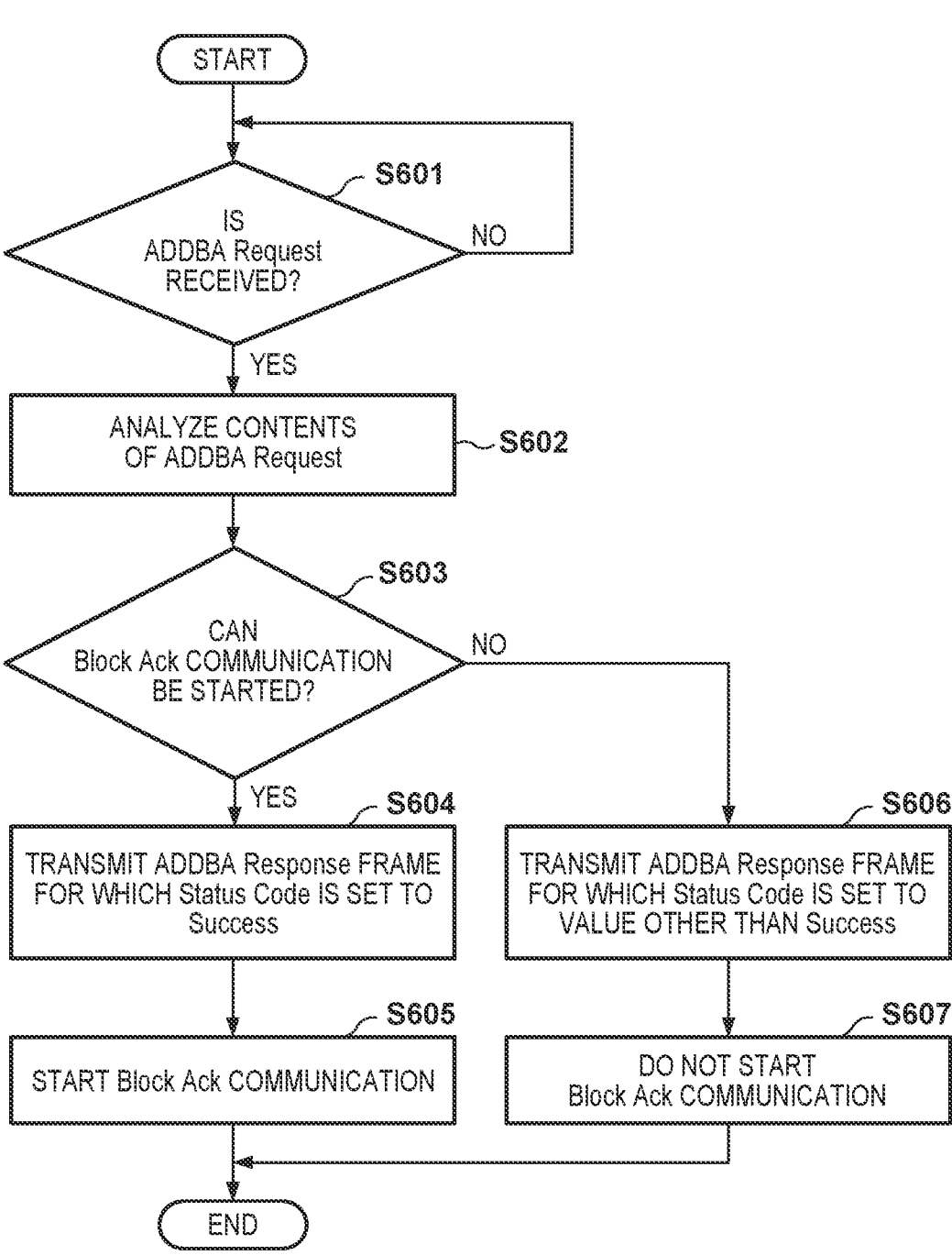
FIG. 6 is a flowchart illustrating an example of processing of an STA when executing Block Ack communication.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Configuration of Network)

FIG. 1 shows an example of the configuration of a network 101 according to an embodiment. The network 101 is a wireless network created by a communication apparatus 102 functioning as an access point (AP). Note that in this embodiment, if the communication apparatus 102 creates a plurality of networks, the BSSIDs of the respective networks are the same. Note that BSSID is an acronym for Basic Service Set Identifier, and is an identifier for identifying a network. The communication apparatus 102 sets a common SSID as an SSID indicated in each network. Note that SSID is an acronym for Service Set Identifier, and is an identifier for identifying an access point. In this embodiment, even if the communication apparatus 102 establishes a plurality of connections, one SSID is used. A communication apparatus 103 is a communication apparatus functioning as a station (STA), and joins the network 101 created by the communication apparatus 102 to communicate with the communication apparatus 102.

Each communication apparatus supports the IEEE 802.11be (EHT) standard, and can execute wireless communication complying with the IEEE 802.11be standard. Note that IEEE is an acronym for Institute of Electrical and Electronics Engineers. EHT is an acronym for Extremely High Throughput or Extreme High Throughput. Each communication apparatus can execute communication in each of the 2.4-, 5-, and 6-GHz frequency bands. Furthermore, each communication apparatus can execute communication using 20-, 40-, 80-, 160-, and 320-MHz bandwidths.

The communication apparatuses 102 and 103 can implement multi-user (MU) communication of multiplexing signals of a plurality of users by OFDMA (Orthogonal Frequency Division Multiple Access) complying with the IEEE 802.11be standard. In OFDMA, some (Resource Units (RUs)) of divided frequency bands are allocated to one or more STAs not to overlap each other, and carrier waves allocated to the respective STAs are orthogonal to each other. Such resource allocation that the carrier waves are orthogonal to each other allows the AP to simultaneously communicate with the plurality of STAs while sufficiently suppressing the influence of interference between signals transmitted/received to/from the plurality of STAs.

The communication apparatuses 102 and 103 can execute multi-band communication in which communication is executed by establishing connections via a plurality of frequency channels. For example, the communication apparatus 102 can establish, with the communication apparatus 103, the first connection using the first frequency channel in the 2.4-GHz band and the second connection using the second frequency channel in the 5-GHz band, thereby executing communication via the first connection and the second connection. That is, if each of the communication apparatuses 102 and 103 establishes a plurality of connections with the partner apparatus, it can execute communication in the respective connections simultaneously. In this case, the communication apparatus 102 maintains the second connection simultaneously with the first connection. The communication apparatus 102 can establish, with the communication apparatus 103, a plurality of connections using a plurality of frequency channels, thereby improving throughput in communication with the communication apparatus 103. As a result, it is possible to shorten the time required for data communication between the communication apparatuses 102 and 103. Furthermore, when the communication apparatus 102 establishes, with the communication apparatus 103, a plurality of connections in different frequency bands, even if a given frequency band is congested or the radio quality of the frequency band is insufficient, the communication apparatus 102 can execute communication in another frequency band. This can prevent a decrease in throughput in communication between the communication apparatuses 102 and 103. Note that more generally, multi-band communication can be replaced by multi-link communication in which a plurality of radio links are established. That is, if frequency bands used by radio links are different from each other, multi-band communication is executed but the radio links may be established using a plurality of wireless channels in the same frequency band. That is, the plurality of connections may be established in the different frequency bands, as described above, or may be established using different frequency channels in the same frequency band.

Note that the communication apparatus 102 can execute backup communication by establishing a plurality of connections with the communication apparatus 103. For example, the communication apparatus 102 can transmit data to the communication apparatus 103 using a given frequency channel while transmitting the same data to the communication apparatus 103 using another frequency channel. Thus, even if the communication apparatus 103 cannot receive the data in communication using one frequency channel, it can receive the data in communication using the other frequency channel. In this way, when backup communication of simultaneously transmitting the same data using the different frequency channels is executed, even if a failure or error occurs in communication using one frequency channel, it is possible to execute data communication using the other frequency channel.

In this embodiment, for example, the communication apparatus 102 establishes, with the communication apparatus 103, three connections using frequency channels in different frequency bands of the 2.4-, 5-, and 6-GHz bands. That is, the communication apparatus 102 can establish connections with the communication apparatus 103 using the first frequency channel in the 2.4-GHz band, the second frequency channel in the 5-GHz band, and the third frequency channel in the 6-GHz band, respectively. The communication apparatuses 102 and 103 may establish connections using a plurality of different frequency channels in the first frequency band while establishing a connection using a frequency channel in the second frequency band different from the first frequency band. For example, the communication apparatus 102 can establish connections with the communication apparatus 103 using the first frequency channel and the second frequency channel in the 2.4-GHz band and the third frequency channel in the 5-GHz band.

If the communication apparatuses 102 and 103 establish a plurality of connections, they can transmit/receive signals via one connection, thereby controlling other connections. For example, if the communication apparatuses 102 and 103 simultaneously establish the first connection in the first frequency band and the second connection in the second frequency band, they can transmit/receive signals via the first connection, thereby controlling the second connection. For example, the communication apparatus 102 can transmit, to the communication apparatus 103, a signal to request disconnection of the connection in the first frequency channel, thereby disconnecting, from the communication apparatus 103, the connection in the second frequency channel. Furthermore, for example, the communication apparatus 102 can perform association with the communication apparatus 103 in the first frequency channel, thereby establishing the connection with the communication apparatus 103 in the second frequency channel. Even if the communication apparatuses 102 and 103 establish the first connection and the second connection using the first frequency channel and the second frequency channel in the same frequency band, respectively, the same control operation can be performed. Note that in this case, the first frequency channel and the second frequency channel need not be adjacent to each other. For example, the communication apparatuses 102 and 103 can establish connections using two frequency channels which are away from each other by 20 MHz or more, and can transmit/receive signals via the connection using one frequency channel to control the connection using the other frequency channel. In one example, the communication apparatuses 102 and 103 can establish the first connection in channel 36 and the second connection in channel 52 in the 5-GHz band, thereby controlling, via one of the first connection and the second connection, the other connection.

Note that a control signal transmitted using the first frequency channel is, for example, a management frame complying with the IEEE 802.11be standard. The management frame can be, for example, a Beacon frame, a Probe Request/Response frame, or an Association Request/Response frame. In addition to these frames, a Disassociation frame, an Authentication frame, a De-Authentication frame, and an Action frame can also be called management frames. The Beacon frame is a frame that makes a notification of network information. The Probe Request frame is a frame that requests network information, and the Probe Response frame is a response to the Probe Request frame and is a frame that provides the network information. The Association Request frame is a frame that requests connection, and the Association Response frame is a response to the Association Request frame and is a frame that indicates permission of connection or an error. The Disassociation frame is a frame used to disconnect the connection. The Authentication frame is a frame used to authenticate the partner apparatus. The De-Authentication frame is a frame used to interrupt authentication of the partner apparatus and execute disconnection of the connection. The Action frame is a frame used to execute an additional function other than the functions of the above-described management frames.

Note that each of the communication apparatuses 102 and 103 supports the IEEE 802.11be standard. In addition to this, each of the communication apparatuses 102 and 103 may support at least one of the legacy standards as standards defined before the IEEE 802.11be standard. The legacy standards include the IEEE 802.11a/b/g/n/ac/ax standards. Furthermore, in addition to the IEEE 802.11 standard series, each of the communication apparatuses 102 and 103 may support another communication standard such as Bluetooth®, NFC, UWB, Zigbee, or MBOA. Note that UWB is an acronym for Ultra Wide Band, and MBOA is an acronym for Multi Band OFDM Alliance. Note also that OFDM is an acronym for Orthogonal Frequency Division Multiplexing. NFC is an acronym for Near Field Communication. UWB includes wireless USB, wireless 1394, and WiNET. In addition, each of the communication apparatuses 102 and 103 may support a communication standard of wired communication such as a wired LAN.

The communication apparatus 102 can be, for example, a wireless LAN router, a PC, or the like, but is not limited to them. The communication apparatus 102 can be an arbitrary communication apparatus that can execute multi-band communication with another communication apparatus. The communication apparatus 103 can be, for example, a camera, a tablet, a smartphone, a PC, a mobile phone, a video camera, or the like, but is not limited to them. The communication apparatus 103 can be an arbitrary communication apparatus that can execute multi-band communication with another communication apparatus. At least one of the communication apparatuses 102 and 103 may be an information processing apparatus such as a radio chip that can execute wireless communication complying with the IEEE 802.11be standard. Furthermore, FIG. 1 shows the network including one AP and one STA. However, this is merely an example, and the network may include two or more APs and two or more STAs. Note that the information processing apparatus such as a radio chip can include an antenna for transmitting a generated signal.

(Arrangement of Apparatus)

An example of the arrangement of the communication apparatuses 102 and 103 will be described. FIG. 2 is a block diagram showing an example of the hardware arrangement of each of the communication apparatuses 102 and 103 according to this embodiment. Each communication apparatus (each of the communication apparatuses 102 and 103) includes, for example, a storage unit 201, a control unit 202, a function unit 203, an input unit 204, an output unit 205, a communication unit 206, and antennas 207 to 209.

The storage unit 201 includes one or more memories such as a ROM and a RAM, and stores computer programs configured to perform various kinds of operations to be described later and various kinds of information such as communication parameters for wireless communication. Note that ROM is an acronym for Read Only Memory, and RAM is an acronym for Random Access Memory. Note also that the storage unit 201 may include a storage medium such as a flexible disk, a hard disk, an optical disk, a magnetooptical disk, a CD-ROM, a CD-R, a magnetic tape, a nonvolatile memory card, or a DVD in addition to or instead of the memory such as a ROM or a RAM. The storage unit 201 may include a plurality of memories.

The control unit 202 is formed by, for example, one or more processors such as a CPU and an MPU, and controls the whole communication apparatus by executing, for example, the computer programs stored in the storage unit 201. Note that CPU is an acronym for Central Processing Unit, and MPU is an acronym for Micro Processing Unit. The control unit 202 can be configured to execute processing of generating data and signals to be transmitted in communication with another communication apparatus in addition to control of the whole communication apparatus. Note that the control unit 202 may be configured to execute processing such as control of the whole communication apparatus by cooperation of the computer programs stored in the storage unit 201 and an operating system (OS). The control unit 202 may include a plurality of processors such as a multi-core processor, and execute processing such as control of the whole communication apparatus by the plurality of processors.

Furthermore, the control unit 202 controls the function unit 203 and executes predetermined processing such as image capturing, printing, or projection. The function unit 203 is hardware for the apparatus to execute predetermined processing. For example, if the apparatus is a camera, the function unit 203 is an image capturing unit and performs image capturing processing. For example, if the apparatus is a printer, the function unit 203 is a print unit and performs print processing. Furthermore, for example, if the apparatus is a projector, the function unit 203 is a projection unit and performs projection processing. Data to be processed by the function unit 203 may be data stored in the storage unit 201, or may be data communicated with another AP or STA via the communication unit 206 to be described later.

The input unit 204 accepts various kinds of operations from the user. The output unit 205 performs various kinds of outputs to the user. Here, the output by the output unit 205 includes, for example, at least one of display on a screen, audio output by a loudspeaker, vibration output, and the like. Note that both the input unit 204 and the output unit 205 may be implemented by one module, like a touch panel. Each of the input unit 204 and the output unit 205 may be included in the communication apparatus, or may be formed as an external apparatus connected to the communication apparatus.

The communication unit 206 controls wireless communication complying with the IEEE 802.11 standard series or controls IP communication. In this embodiment, the communication unit 206 is particularly configured to control wireless communication complying with the IEEE 802.11be standard. The communication unit 206 may control wired communication such as a wired LAN. The communication unit 206 controls the antennas 207 to 209 and transmits/receives radio signals for wireless communication, which are generated by the control unit 202. Note that if the communication apparatus supports the NFC standard or Bluetooth standard in addition to the IEEE 802.11be standard, the communication unit 206 may control wireless communication complying with these communication standards. If the communication apparatus can execute wireless communication complying with each of a plurality of communication standards, it may include the communication unit and the antenna supporting each communication standard. The communication apparatus communicates data such as image data, document data, or video data with a partner communication apparatus via the communication unit 206. Note that at least one of the antennas 207 to 209 may be prepared separately from the communication unit 206, or may be combined with the communication unit 206 to form one module.

The antennas 207 to 209 are antennas capable of executing communication in the 2.4-, 5-, and 6-GHz bands, respectively. That is, the communication apparatus includes, for each frequency band, an antenna corresponding to the frequency band. Note that it is unnecessary to prepare a different antenna for each frequency band, and the communication apparatus may be configured to use multi-band antennas to execute communication in the above-described three frequency bands by one or two antennas. The communication apparatus may include four or more antennas. FIG. 2 shows the arrangement in which the communication apparatus includes the one communication unit 206 for the plurality of antennas 207 to 209 but a plurality of communication units 206 respectively corresponding to the plurality of antennas may be prepared.

FIG. 3 shows an example of the functional arrangement of the communication apparatus (each of the communication apparatuses 102 and 103). The communication apparatus includes, for example, a first wireless LAN control unit 301, a second wireless LAN control unit 306, and a third wireless LAN control unit 307 that control wireless LAN communication in the three frequency bands of the 2.4-, 5-, and 6-GHz bands, respectively. However, these are merely examples. For example, wireless LAN control concerning a plurality of frequency bands may be executed by a common wireless LAN control unit, and two or less wireless LAN control units may be prepared. Furthermore, to cope with more frequency bands or more distributively perform communication control in one frequency band, four or more wireless LAN control units may be prepared. These wireless LAN control units execute communication control of a wireless LAN in accordance with various kinds of procedures defined in the IEEE 802.11 standard series. Note that in this embodiment, these wireless LAN control units comply with the IEEE 802.11be standard. Each wireless LAN control unit can be implemented by antennas and circuits configured to transmit/receive radio signals to/from another communication apparatus having a wireless LAN communication function, and programs configured to control these.

Each of the communication apparatuses 102 and 103 further includes a frame generation unit 302, a frame analysis unit 303, a UI control unit 304, and a storage control unit 305.

The frame generation unit 302 generates a radio control frame to be transmitted by at least one of the above-described wireless LAN control units. The radio control frame generated by the frame generation unit 302 can be generated based on settings stored in the storage unit 201. In addition to or instead of these, based on user settings input by the user, the frame generation unit 302 may generate a radio control frame. The frame analysis unit 303 interprets a radio control frame received by each wireless LAN control unit and reflects the contents of the received radio control frame on at least one of the above-described wireless LAN control units. If, for example, the radio control frame received via the first wireless LAN control unit 301 indicates disconnection of the connection in the 5-GHz band, the second wireless LAN control unit 306 stops transmission/reception of a radio signal. Even the radio control frame received by any wireless LAN control unit can be analyzed by the frame analysis unit 303 and then used to control the wireless LAN control unit that has not received the radio control frame.

The UI control unit 304 is formed by including a program for controlling at least one of the input unit 204 and the output unit 205. The UI control unit 304 has a function of presenting information concerning the communication apparatus to the user, such as display of an image or the like or audio output via the output unit 205. The storage control unit 305 controls data write and read in and from the storage unit 201 that saves data and programs to operate in the communication apparatus.

(Procedure of Processing)

Subsequently, an example of the procedure of processing executed in this embodiment will be described. In this embodiment, as described above, the communication apparatuses 102 and 103 execute communication by establishing a plurality of links using a plurality of frequency channels in one or more frequency bands. Then, the communication apparatuses 102 and 103 execute communication in the plurality of links simultaneously. At this time, the communication apparatuses 102 and 103 are configured to send an acknowledgement for the communication in the plurality of links. Note that an acknowledgement for acknowledgements (Acks) concerning a plurality of data is called a Block Ack (to also be referred to as a BA hereinafter). Data communication using a BA (transmission/reception of data and transmission/reception of a BA with respect to the data) is called Block Ack communication. The use of a BA makes it possible to reduce the transmission frequency of an acknowledgement (Ack), and improve throughput by increasing radio resources that can be used to transmit/receive data. A procedure of applying Block Ack communication to two or more of the plurality of links will be described below. Note that Block Ack communication indicates control communication in which an acknowledgement is transmitted/received for communication in two or more of the plurality of links using the plurality of different frequency channels.

FIG. 4 shows an example of the procedure of processing executed for Block Ack communication. FIG. 5 shows an example of the procedure of processing executed by the communication apparatus 102 to start Block Ack communication. FIG. 6 shows an example of the procedure of processing executed by the communication apparatus 103 to start Block Ack communication. The communication apparatus 102 starts processing (to be described below) based on, for example, an instruction from an application operating in the communication apparatus 102. The communication apparatus 102 may start the processing (to be described below) for every predetermined time after the self-apparatus is powered on or for every predetermined time after a connection with the STA (communication apparatus 103) is established. Furthermore, the communication apparatus 102 may start the processing (to be described below) based on a user instruction to establish Block Ack communication. The communication apparatus 102 executes the processing (to be described below) by, for example, reading out the computer program stored in the storage unit 201 into the control unit 202 and executing it. The communication apparatus 103 may start the processing (to be described below) in response to power-on of the communication apparatus 103 or establishment of a connection with the AP (communication apparatus 102). The communication apparatus 103 may start the processing (to be described below) using the same trigger as that used by the communication apparatus 102. The communication apparatus 103 can also execute the processing (to be described below) by, for example, reading out the computer program stored in the storage unit 201 into the control unit 202 and executing it.

The communication apparatus 102 operating as an AP decides parameters to be used for Block Ack communication (S401). For example, the communication apparatus 102 decides a frequency band to be used by itself for Block Ack communication (step S501). If the communication apparatus 102 establishes a wired or wireless connection with another AP other than the self-apparatus, it may acquire, before executing the processing, information concerning a frequency band to be used for Block Ack communication from the other currently connected AP. For example, the communication apparatus 102 may decide, as a frequency band to be used for Block Ack communication, a frequency band that is not used by another peripheral AP. This makes it possible to execute communication using a frequency band in which communication is not relatively performed. Alternatively, the communication apparatus 102 may decide, as a frequency band to be used for Block Ack communication, a frequency band that is used by another peripheral AP. For example, the communication apparatus 102 may decide a frequency band to be used for Block Ack communication with the communication apparatus 103 using a frequency band that has been used by another AP, to which the communication apparatus 103 (STA) was connected in the past, for Block Ack communication with the STA. This makes it possible to select a frequency band in which Block Ack communication with the communication apparatus 103 can be executed highly probably. In this example, assume that the communication apparatus 102 decides to execute Block Ack communication in two frequency bands of the 2.4- and 5-GHz bands. Then, the communication apparatus 102 decides a frequency band to be used to transmit, to the communication apparatus 103, information concerning the frequency bands to be used for Block Ack communication (step S502). Note that the frequency bands to be used for Block Ack communication and frequency channels in the frequency bands may be decided in step S501, and which of the decided frequency channels is used to make an information notification may be decided in step S502. For example, it may be decided to execute Block Ack communication using two or more frequency channels in the same frequency band. At this time, by using at least one of the decided two or more frequency channels, a notification of information of the use frequency channel is made.

The communication apparatus 102 transmits, to the communication apparatus 103 in the frequency band decided in step S502, information concerning the frequency bands to be used for Block Ack communication (S402, step S503). In this embodiment, the communication apparatus 102 makes a notification of the information concerning the frequency bands to be used for Block Ack communication using an ADDBA Request frame. For example, the communication apparatus 102 transmits an ADDBA Request frame, shown in FIG. 7, including a Multi-band element to be described later with reference to FIG. 9 in at least one of the frequency bands to be used for Block Ack communication. Thus, the communication apparatus 102 notifies the communication apparatus 103 of the frequency bands to be used for Block Ack communication. In this embodiment, the communication apparatus 102 transmits the ADDBA Request frame in the 2.4-GHz band of the frequency bands to be used for Block Ack communication. The ADDBA Request frame transmitted here can include, as the information concerning the frequency bands to be used for Block Ack communication, information concerning all the frequency channels decided in S401. However, the present invention is not limited to this, and information concerning only some of the frequency channels decided in S401 may be included.

The information concerning the frequency bands to be used for Block Ack communication in the ADDBA Request frame includes information concerning the frequency bands other than the frequency band in which the ADDBA Request frame is transmitted. For example, if the ADDBA Request frame is transmitted only in the 2.4-GHz band, information concerning the 5- or 6-GHz band is included as the information concerning the frequency band to be used for Block Ack communication in the ADDBA Request frame. Note that in this embodiment, the communication apparatus 102 decides to execute Block Ack communication in the 2.4- and 5-GHz bands, as described above. Therefore, the communication apparatus 102 transmits, to the communication apparatus 103, the ADDBA Request frame including the information concerning the 5-GHz band as the information concerning the frequency band to be used for Block Ack communication. Note that the information concerning the frequency band to be used for Block Ack communication in the ADDBA Request frame may include information concerning the frequency band in which the ADDBA Request frame is transmitted. That is, if the ADDBA Request frame is transmitted in the 2.4-GHz band, information concerning the 2.4-GHz band may be included as the information concerning the frequency band to be used for Block Ack communication.

If the communication apparatus 103 operating as an STA successfully receives the ADDBA Request frame transmitted by the communication apparatus 102 (YES in step S601), it transmits an acknowledgement (Ack) (S403). Note that this acknowledgement may be omitted by transmitting an ADDBA Response frame later. That is, since the ADDBA Response frame is a response signal to the ADDBA Request frame, the transmission of the frame can implicitly indicate that the ADDBA Request frame has successfully been received.

Upon receiving the ADDBA Request frame, the communication apparatus 103 analyzes the contents (step S602), and prepares an ADDBA Response frame by setting contents in accordance with the analysis result and transmits it. For example, the communication apparatus 103 acquires, from the Multi-band element included in the ADDBA Request frame, the information concerning the frequency band to be used by the communication apparatus 102 for Block Ack communication. Then, the communication apparatus 103 determines whether it can start Block Ack communication in the frequency band (step S603). For example, the communication apparatus 103 can perform this determination processing based on whether Block Ack communication in the frequency band included in the acquired information is supported, whether resources for calculation for Block Ack communication are held, and the like.

If the communication apparatus 103 can start Block Ack communication in the notified frequency band (YES in step S603), it generates an ADDBA Response frame for which Status Code is set to "Success" and transmits the ADDBA Response frame (S404, step S604). Note that the ADDBA Response frame is transmitted in the frequency band (the 2.4-GHz band in the example shown in FIG. 4) in which the ADDBA Request frame has been received. This enables the communication apparatus 103 to start Block Ack communication (step S605). Then, if the communication apparatus 102 receives the ADDBA Response frame (YES in step S504), and confirms that the Status Code is "Success" (YES in step S505), it starts Block Ack communication (step S506). Note that in response to the reception of the ADDBA Response frame, the communication apparatus 102 can transmit an acknowledgement (Ack) (S405). Then, communication parameters to be used for Block Ack communication between the communication apparatuses 102 and 103 are confirmed (S406). Note that by the ADDBA Request frame, the communication apparatus 103 may be notified of communication parameters other than the frequency bands decided by the communication apparatus 102. In this case, the communication apparatus 103 can transmit the ADDBA Response frame by including the result of determining whether the communication parameters are usable. In addition to the ADDBA Request and Response frames for determining the frequency bands to be used for Block Ack communication, other signals for determining parameters may be transmitted/received between the communication apparatuses 102 and 103 in, for example, S406.

On the other hand, if the communication apparatus 103 cannot start Block Ack communication in the notified frequency bands (NO in step S603), it generates an ADDBA Response frame for which the Status Code is set to a value other than "Success", and transmits the ADDBA Response frame (step S606). In this case, the communication apparatus 103 starts no Block Ack communication (step S607). If the communication apparatus 102 receives the ADDBA Response frame (YES in step S504), and confirms that the Status Code is not "Success" (NO in step S505), the communication apparatus 102 starts no Block Ack communication (step S507). In this case as well, the communication apparatus 102 can transmit an acknowledgement (Ack) in response to the reception of the ADDBA Response frame (S405).

Note that if the communication apparatus 103 does not receive the ADDBA Request frame successfully (NO in step S601), it transmits no ADDBA Response frame. Then, if the communication apparatus 102 cannot receive the ADDBA Response frame (NO in step S504), it starts no Block Ack communication (step S507). Note that if, even though the communication apparatus 103 receives the ADDBA Request frame, the communication apparatus 103 cannot acquire information because of a failure of decoding of the frame, the communication apparatus 103 may transmit a negative acknowledgement (Nack) to the communication apparatus 102, thereby prompting the communication apparatus 102 to retransmit the ADDBA Request frame.

After that, the communication apparatuses 102 and 103 transmit/receive data by established Block Ack communication using the confirmed communication parameters. FIG. 4 exemplifies that the communication apparatuses 102 and 103 transmit/receive data using the connection in the 2.4-GHz band (S411 to S413) and transmit/receive data using the connection in the 5-GHz band (S421 to S423).

The structure of the ADDBA Request frame and the structure of the ADDBA Response frame will be described with reference to FIGS. 7 and 8, respectively.

Figure 7:
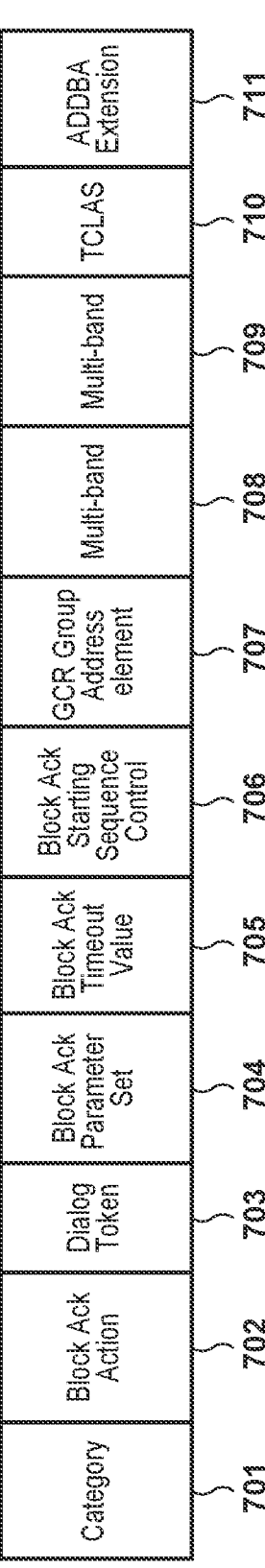
FIG. 7 is a view showing an example of the structure of an ADDBA Request frame.

As shown in FIG. 7, the ADDBA Request frame includes a plurality of information fields storing different kinds of information. The ADDBA Request frame is sequentially transmitted from a Category field 701 as the first information field. Note that the communication apparatus 102 may generate all the fields of the ADDBA Request frame and then transmit the frame, or may generate and transmit each field sequentially from the Category field 701. The transmission/reception order of the fields is not limited to that shown in FIG. 7. That is, the order of the fields may be different from that shown in FIG. 7. In addition, any of the fields may be eliminated, and a field not shown in FIG. 7 may be added between two arbitrary fields. Information stored in each field shown in FIG. 7 will be described below.

The Category field 701 stores an identifier for identifying the category of the frame. In this embodiment, an identifier "3" indicating Block Ack-related processing is stored in the Category field 701. A Block Ack Action field 702 stores an identifier for identifying processing contents in the Block Ack. In this embodiment, an identifier "0" indicating the ADDBA Request frame is stored in the Block Ack Action field 702. A Dialog Token field 703 stores a non-zero value selected by the STA.

A Block Ack Parameter Set field 704 stores information such as A-MSDU Supported, Block Ack Policy, TID, and Buffer Size. A-MSDU Supported is information indicating whether the STA supports A-MSDU at the time of transmitting a QoS Data frame in Block Ack communication. Block Ack Policy is information indicating whether Block Ack communication to be used is an Immediate Block Ack or Delayed Block Ack. TID is a traffic identifier designated when establishing Block Ack communication. Buffer Size is information indicating the size of a reordering buffer usable for TID.

A Block Ack Timeout Value field 705 stores information indicating the time from the start of Block Ack communication until a time-out occurs when no frame transmission/reception is performed for a given time to end the Block Ack communication. A Block Ack Starting Sequence Control field 706 stores information indicating the sequence number of an MSDU to be transmitted next. A GCR Group Address field 707 stores a value indicating a Group Cast with Retries (GCR) group address of Block Ack communication to be started. Multi-band fields 708 and 709 each store information concerning a frequency band to be used for multi-band communication. A TCLAS field 710 stores a traffic class. An ADDBA Extension field 711 stores ADDBA Capabilities information and the like. The ADDBA Capabilities information includes information indicating whether Block Ack communication to be started supports transmission of a fragmented MSDU in MPDU transmission.

Note that the GCR Group Address field 707, the Multi-band fields 708 and 709, the TCLAS field 710, and the ADDBA Extension field 711 are optional fields. Therefore, these fields may or may not be included in the ADDBA Request frame.

FIG. 8 is a view showing an example of the structure of the ADDBA Response frame. As shown in FIG. 8, the ADDBA Response frame includes a plurality of information fields storing different kinds of information. The ADDBA Response frame is sequentially transmitted from a Category field 801 as the first information field. Note that the communication apparatus 103 may generate all the fields of the ADDBA Response frame and then transmit the frame, or may generate and transmit each field sequentially from the Category field 801. The transmission/reception order of the fields is not limited to that shown in FIG. 8. That is, the order of the fields may be different from that shown in FIG. 8. In addition, any of the fields may be eliminated, and a field not shown in FIG. 8 may be added between two arbitrary fields. Information stored in each field shown in FIG. 8 will be described below.

The Category field 801 stores an identifier for identifying the category of the frame. In this embodiment, an identifier "3" indicating Block Ack-related processing is stored in the Category field 801. A Block Ack Action field 802 stores an identifier for identifying processing contents in the Block Ack. In this embodiment, an identifier "1" indicating the ADDBA Response frame is stored in the Block Ack Action field 802. A Dialog Token field 803 stores the same value as that of the Dialog Token field 703 of the ADDBA Request frame.

A Status Code field 804 stores information indicating whether Block Ack communication can be started. If Block Ack communication can be started, a value "0" indicating success ("Success") is stored in the Status Code field 804.

A Block Ack Parameter Set field 805 stores information such as A-MSDU Supported, Block Ack Policy, TID, and Buffer Size. Details of these pieces of information are as described above. A Block Ack Timeout Value field 806 stores information indicating the time from the start of Block Ack communication until a time-out occurs when no frame transmission/reception is performed for a given time to end the Block Ack communication. A GCR Group Address field 807 stores a value indicating a Group Cast with Retries (GCR) group address of Block Ack communication to be started. Multi-band fields 808 and 809 each store information concerning a frequency band to be used for multi-band communication. A TCLAS field 810 stores a traffic class. An ADDBA Extension field 811 stores ADDBA Capabilities information and the like. The ADDBA Capabilities information includes information indicating whether Block Ack communication to be started supports transmission of a fragmented MSDU in MPDU transmission.

Note that the GCR Group Address field 807, the Multi-band fields 808 and 809, the TCLAS field 810, and the ADDBA Extension field 811 are optional fields. Therefore, these fields may or may not be included in the ADDBA Response frame.

An example of the structure of the information element (Multi-band element) included in the above-described Multi-band field will be described with reference to FIG. 9. As shown in FIG. 9, the multi-band element includes a plurality of information subfields storing different kinds of information. The Multi-band element is sequentially transmitted from an Element ID subfield 901 as the first information subfield. Note that the Multi-band element may be transmitted after all the subfields are generated, or each subfield may be generated and transmitted sequentially from the Element ID subfield 901. The transmission/reception order of the subfields is not limited to that shown in FIG. 9. That is, the order of the subfields may be different from that shown in FIG. 9. In addition, any of the subfields may be eliminated, and a subfield not shown in FIG. 9 may be added between two arbitrary fields. Note that the values of the subfields shown in FIG. 9 comply with the conventional standard and a detailed description thereof will be omitted. In this embodiment, frequency band information is included in a Band ID subfield 904, and then transmission/reception is executed.

As described above, each of the ADDBA Request frame and the ADDBA Response frame includes two Multi-band elements to include information of the use frequency bands for two links. If Block Ack communication is executed with respect to three or more links, Multi-band elements the number of which is equal to the number of links can be included in each of the ADDBA Request frame and the ADDBA Response frame. This can set Block Ack communication in the plurality of links established using one or more frequency bands.

Referring to FIG. 4, after executing Block Ack communication, for example, the communication apparatuses 102 and 103 can decide to end the Block Ack communication in response to the completion of scheduled data transmission/reception (S407). Processing when ending Block Ack communication will now be described with reference to FIGS. 10 and 11.

FIG. 10 shows an example of the procedure of processing executed by the communication apparatus 102 to end Block Ack communication with the communication apparatus 103. FIG. 11 shows an example of the procedure of processing executed by the communication apparatus 103 to end Block Ack communication with the communication apparatus 102. Each of the communication apparatuses 102 and 103 executes the processing (to be described below) by, for example, reading out the computer program stored in the storage unit 201 into the control unit 202 and executing it. Note that the processing shown in FIG. 10 may be executed by the communication apparatus 103, and the processing shown in FIG. 11 may be executed by the communication apparatus 102.

If the communication apparatus 102 decides to end Block Ack communication (YES in step S1001), it starts processing of ending the Block Ack communication (step S1002). For example, if there is no data to be transmitted in the Block Ack communication executed between the communication apparatuses 102 and 103 (the buffer is empty), the communication apparatus 102 decides to end the Block Ack communication. In the end processing, the communication apparatus 102 generates a frame to request the end of the Block Ack communication. This frame includes information indicating the Block Ack communication to be ended. That is, for example, if a plurality of instances of Block Ack communication are executed, information indicating Block Ack communication that is requested to be ended is included in the frame generated in step S1002. In this embodiment, the communication apparatus 102 generates, as the frame to request the end of the Block Ack communication, an Action frame including a DELBA frame. Then, the communication apparatus 102 transmits the generated frame (S408, step S1003). Note that in this embodiment, the communication apparatus 102 transmits the frame to request the end of the Block Ack communication via the connection in the 2.4-GHz band. The frame to request the end of the Block Ack communication can be transmitted in the frequency band (frequency channel) in which the ADDBA Request frame has been transmitted to start the Block Ack communication. Note that the present invention is not limited to this, and the frame to request the end of the Block Ack communication may be transmitted in one of the frequency bands (frequency channels) in which the Block Ack communication is executed.

The communication apparatus 103 determines whether a frame concerning the end of the Block Ack is received (step S1101). For example, the communication apparatus 103 determines whether an Action frame including a DELBA frame is received. If the communication apparatus 103 receives such Action frame, it determines that the frame concerning the end of the Block Ack is received. Note that in step S1101, the communication apparatus 103 may determine whether a DELBA frame including a Multi-band element is received. In this case, if a DELBA frame including a Multi-band element is received, the communication apparatus 103 determines that it receives the frame concerning the end of the Block Ack. While the frame concerning the end of the Block Ack is not received (NO in step S1101), the communication apparatus 103 continues to monitor whether such frame is received. On the other hand, if such frame is received (YES in step S1101), the communication apparatus 103 analyzes the received frame (DELBA frame) (step S1102). Note that if the received DELBA frame includes a Multi-band element, the communication apparatus 103 analyzes the Multi-band element. The communication apparatus 103 specifies, by the analysis, the Block Ack communication that is requested to be ended. Then, the communication apparatus 103 transmits an Ack to the communication apparatus 102 (S409, step S1103), and ends the Block Ack communication (step S1104). Furthermore, the communication apparatus 102 receives the Ack from the communication apparatus 103 (step S1004), and ends the Block Ack communication (step S1005).

An example of the structure of the DELBA frame as an element of a management frame in the IEEE 802.11be standard will be described with reference to FIG. 12. As shown in FIG. 12, the DELBA frame includes a plurality of information fields storing different kinds of information. These fields are sequentially transmitted from a Category field 1201 as the first information field. Note that all the fields of the DELBA frame may be generated and then the DELBA frame may be transmitted, or each field may be generated and transmitted sequentially from the Category field 1201. The transmission/reception order of the fields is not limited to that shown in FIG. 12. That is, the order of the fields may be different from that shown in FIG. 12. In addition, any of the fields may be eliminated, and a field not shown in FIG. 12 may be added between two arbitrary fields. Information stored in each field shown in FIG. 12 will be described below.

The Category field 1201 stores an identifier for identifying the category of the frame. In this embodiment, an identifier "3" indicating Block Ack-related processing is stored in the Category field 1201. A Block Ack Action field 1202 stores an identifier for identifying processing contents in the Block Ack. In this embodiment, an identifier "2" indicating the DELBA frame is stored in the Block Ack Action field 1202.

A DELBA Parameter Set field 1203 stores information subfields such as Initiator and TID subfields. The Initiator subfield stores an identifier for identifying whether the AP or the STA transmits the DELBA frame. In this embodiment, since the communication apparatus 102 serves as the AP, the value of the Initiator subfield is "1" corresponding to the AP. The TID subfield stores the value of a TID designated when establishing Block Ack communication. A Reason Code field 1204 stores an identifier for identifying a reason why the DELBA frame is transmitted. A DELBA GCR Group Address field 1205 stores a value indicating a GCR group address of Block Ack communication to be ended. Multi-band fields 1206 and 1207 each store information concerning a frequency band to be used for multi-band communication. Note that Multi-band elements stored in the fields are as described above with reference to FIG. 9. A TCLAS field 1208 stores information indicating a traffic class. Note that the Multi-band fields 1206 and 1207 and the TCLAS field 1208 are optional fields. Therefore, these fields may or may not be included in the DELBA frame.

In this embodiment, for example, the DELBA frame in which information concerning the 2.4-GHz band is stored in the Multi-band field 1206 and information concerning the 5-GHz band is stored in the Multi-band field 1207 is transmitted. This indicates that Block Ack communication in the 2.4- and 5-GHz bands is ended. This is merely an example, and another structure may be used. For example, by not including any Multi-band field, it may be indicated to end the Block Ack communication in all the frequency bands of the established Block Ack communication. For example, if the DELBA frame is transmitted in the 2.4-GHz band, even if the information concerning the 2.4-GHz band is not stored in the DELBA frame, the use of the 2.4-GHz band for Block Ack communication may be ended. That is, the DELBA frame can be used to end, for Block Ack communication, the use of the frequency band for which no information is included in the frame but in which the frame is transmitted and the frequency band indicated by the information included in the Multi-band field.

In the above-described example, the start and end of Block Ack communication in multi-band communication using two frequency bands of the 2.4- and 5-GHz bands have been described. To start Block Ack communication, ADDBA Request/ADDBA Response frames each including two Multi-band elements for designating the frequency bands are transmitted/received. To end the Block Ack communication, a DELBA frame including two Multi-band elements for designating the frequency bands is transmitted/received. This can apply a Block Ack with respect to communication using the two frequency bands. This method can be applied to multi-band communication using more frequency bands. That is, for example, if three frequency bands are used, Block Ack communication can be started/ended in these frequency bands by using three Multi-band elements corresponding to the frequency bands. Note that a Multi-band element may be extended to designate a frequency channel in addition to the frequency band.

In Block Ack communication using three or more frequency bands, processing of eliminating only some of the frequency bands from Block Ack communication may be executed. An example of processing when the communication apparatuses 102 and 103 execute Block Ack communication using three frequency bands (2.4-, 5-, and 6-GHz bands), and one frequency band is eliminated from Block Ack communication will be described. FIG. 13 shows an example of the procedure of the processing. Note that processes in the respective apparatuses when starting Block Ack communication are the same as those shown in FIGS. 5 and 6, and triggers to start the processes are also as described above. Details of the processes are the same and a description thereof will be omitted.

Referring to FIG. 13, the communication apparatus 102 decides frequency bands to be used for Block Ack communication (S1301, step S501). Assume here that the communication apparatus 102 decides to execute Block Ack communication in three frequency bands of the 2.4-, 5-, and 6-GHz bands. Then, the communication apparatus 102 decides a frequency band for transmitting information concerning the decided frequency bands to be used for Block Ack communication (step S502), and transmits the information in the decided frequency band (S1302, step S503). Note that in the example shown in FIG. 13, the communication apparatus 102 decides the 2.4-GHz band as the frequency band for transmitting the information concerning the decided frequency bands to be used for Block Ack communication. A notification of the information concerning the decided frequency bands to be used for Block Ack communication can be made by an ADDBA Request frame, similar to the case shown in FIG. 4. For example, the communication apparatus 102 can transmit, to the communication apparatus 103, an ADDBA Request frame in which three Multi-band fields 1401 to 1403 corresponding to the three frequency bands to be used are prepared, as shown in FIG. 14. Note that pieces of information stored in the Multi-band fields 1401 to 1403 are as described with reference to FIG. 9, and a notification of information of one frequency band is made using one field. The structure shown in FIG. 14 is the same as that shown in FIG. 7 except that the number of Multi-band fields is different. Therefore, the same reference numerals denote the same fields and a description thereof will be omitted.

If the communication apparatus 103 successfully receives the ADDBA Request frame transmitted by the communication apparatus 102 (YES in step S601), it transmits an acknowledgement (Ack) (S1303). The communication apparatus 103 analyzes the contents of the ADDBA Request frame (step S602), and prepares an ADDBA Response frame by setting contents in accordance with the analysis result and transmits it. That is, the communication apparatus 103 determines whether it can start Block Ack communication in the frequency bands to be used by the communication apparatus 102 for Block Ack Communication (step S603). Then, if Block Ack communication in the notified frequency bands can be started (YES in step S603), the communication apparatus 103 generates a ADDBA Response frame by setting "Success" in a Status Code and transmits it (S1304, step S604). Note that the ADDBA Response frame is transmitted in the frequency band (the 2.4-GHz band in the example shown in FIG. 13) in which the ADDBA Request frame has been received. Thus, the communication apparatus 103 can start Block Ack communication (step S605). Note that the ADDBA Response frame includes three Multi-band fields 1501 to 1503 corresponding to the three frequency bands to be used, as shown in FIG. 15. Note that pieces of information stored in the Multi-band fields 1501 to 1503 are as described with reference to FIG. 9, and a notification of information of one frequency band is made using one field. The structure shown in FIG. 15 is the same as that shown in FIG. 8 except that the number of Multi-band fields is different. Therefore, the same reference numerals denote the same fields and a description thereof will be omitted. If the communication apparatus 102 receives the ADDBA Response frame (YES in step S504), and confirms that the Status Code is "Success" (YES in step S505), it starts Block Ack communication (step S506). Note that in response to the reception of the ADDBA Response frame, the communication apparatus 102 can transmit an acknowledgement (Ack) (S1305). Then, communication parameters to be used for Block Ack communication between the communication apparatuses 102 and 103 are confirmed (S1306).

On the other hand, processing if the communication apparatus 103 cannot start Block Ack communication in the notified frequency bands (NO in step S603) or if the communication apparatus 102 cannot receive the ADDBA Response frame (NO in step S504) is as described above. Note that if the communication apparatus 103 can execute Block Ack communication in some of the plurality of frequency bands included in the ADDBA Request, it can include, in the ADDBA Response frame, information of the frequency band usable for the Block Ack communication, and transmit the frame. For example, assume that the communication apparatus 103 is notified, by the ADDBA Request frame, of the 2.4-, 5-, and 6-GHz bands as frequency bands to be used for Block Ack communication. In this case, the communication apparatus 103 can determine that it can execute Block Ack communication using the 2.4- and 5-GHz bands but cannot use the 6-GHz band. In this case, the communication apparatus 103 may transmit, to the communication apparatus 102, the ADDBA Response frame including two Multi-band fields corresponding to the 2.4- and 5-GHz bands. The communication apparatus 102 can recognize, by the ADDBA Response frame, that only the 2.4- and 5-GHz bands can be used for Block Ack communication, and start Block Ack communication using the frequency bands. Note that in FIG. 13, the communication apparatuses 102 and 103 can execute Block Ack communication in the 2.4-, 5-, and 6-GHz bands, and start Block Ack communication in the frequency bands.

After that, the communication apparatuses 102 and 103 transmit/receive data by the Block Ack communication using the confirmed communication parameters. FIG. 13 exemplifies the case in which the communication apparatuses 102 and 103 transmit/receive data using connections in the 2.4-, 5-, and 6-GHz bands (S1321 to S1323, S1331 to S1333, and S1341 and S1342).

Figure 16:
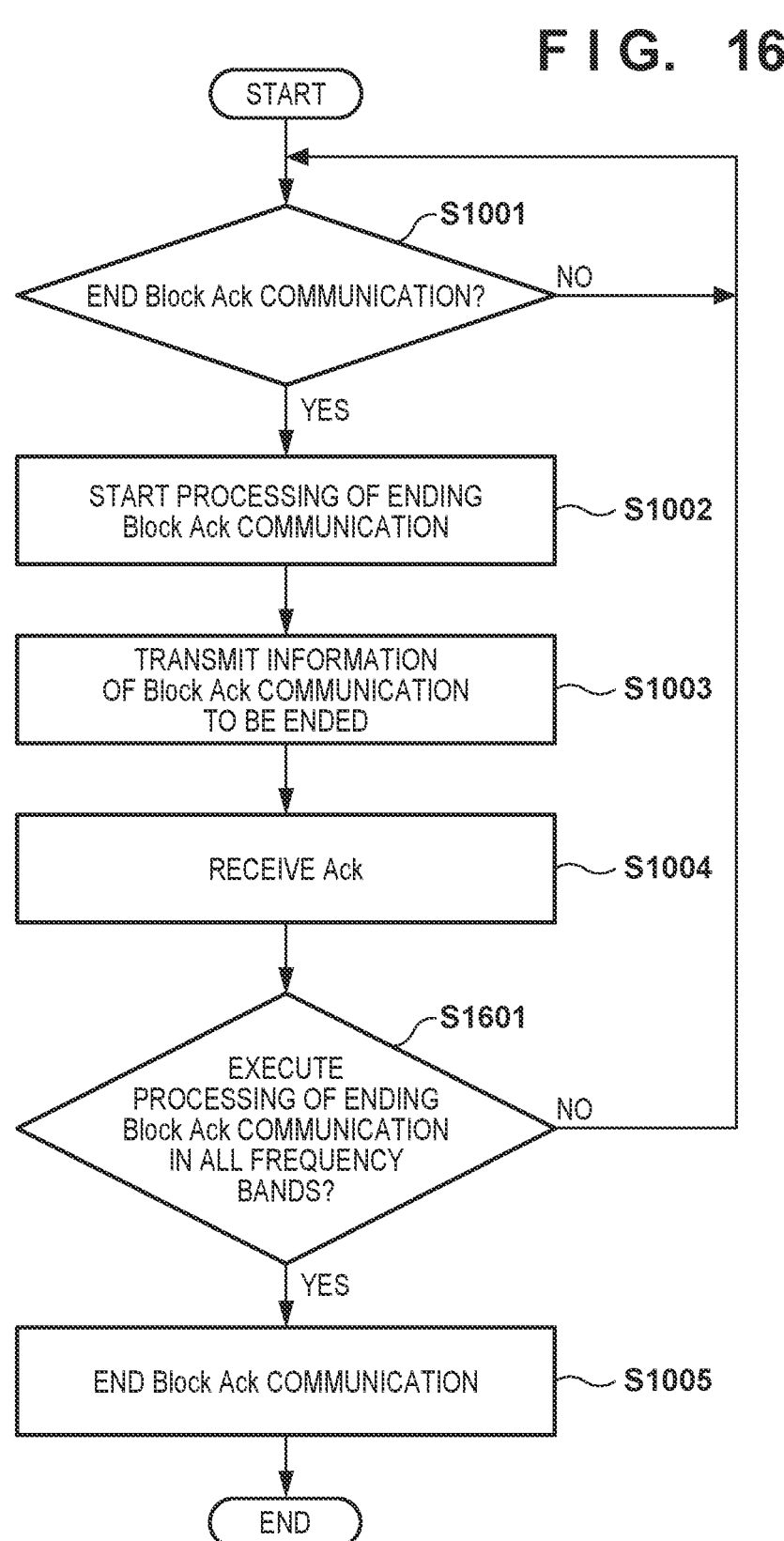
FIG. 16 is a flowchart illustrating an example of processing of the AP when ending Block Ack communication.

After that, the communication apparatuses 102 and 103 decide to end the Block Ack communication in the 6-GHz band while maintaining the Block Ack communication in the 2.4- and 5-GHz bands (S1307). Processes in this case will be described with reference to FIGS. 16 and 17. Note that among the processes shown in FIGS. 16 and 17, the same processes as in FIGS. 10 and 11 are denoted by the same reference symbols and a detailed description thereof will be omitted.

If the communication apparatus 102 decides to end the Block Ack communication in the 6-GHz band (YES in step S1001), it generates a frame to request the end of the Block Ack communication and transmits the frame (steps S1002 and S1003, S1308). The communication apparatus 102 transmits, as the frame to request the end of the Block Ack communication, an Action frame including a DELBA frame in, for example, the frequency band (the 2.4-GHz band in FIG. 13) in which the ADDBA Request frame has been transmitted. FIG. 18 shows an example of the DELBA frame at this time. The DELBA frame includes a Multi-band field 1801 corresponding to the frequency band in which the Block Ack communication is to be ended. The structure of the frame is the same as that in FIG. 12 except that only one Multi-band field is included. The same reference numerals as in FIG. 12 denote the same fields and a description thereof will be omitted. The Multi-band field 1801 shown in FIG. 18 includes information of the frequency band in which the Block Ack communication is to be ended. In this case, the Multi-band field 1801 stores information concerning the 6-GHz frequency band.

In accordance with, for example, whether the Action frame including the DELBA frame is received, the communication apparatus 103 determines whether the frame concerning the end of the Block Ack is received (step S1101). If the communication apparatus 103 receives such frame (YES in step S1101), it analyzes the received frame (DELBA frame) (step S1102). The communication apparatus 103 specifies, by the analysis, that the Block Ack communication in the 6-GHz band is requested to be ended. Then, the communication apparatus 103 transmits an Ack to the communication apparatus 102 (S1309, step S1103), and ends the Block Ack communication in the 6-GHz band. On the other hand, since the communication apparatus 103 continues the Block Ack communication in the 2.4- and 5-GHz bands (NO in step S1701), it monitors reception of a further Action frame including a DELBA frame (step S1101). The communication apparatus 102 receives the Ack from the communication apparatus 103 (step S1004), and ends the Block Ack communication in the 6-GHz band. On the other hand, since the communication apparatus 102 continues the Block Ack communication in the 2.4- and 5-GHz bands (NO in step S1601), it continues to monitor whether to end at least part of the Block Ack communication (step S1001).

After that, the communication apparatuses 102 and 103 can continue the Block Ack communication in the 2.4- and 5-GHz bands (S1324 to S1326 and S1334 to S1336), and then decide to end the Block Ack communication (S1310). The processes (S1311 and S1312) in this case are the same as those in S408 and S409 of FIG. 4. The communication apparatus 102 executes the processing of ending the Block Ack communication in all the frequency bands by this processing (YES in step S1601), and then ends the Block Ack communication (step S1005). The communication apparatus 103 executes the processing of ending the Block Ack communication in all the frequency bands by this processing (YES in step S1701), and then ends the Block Ack communication (step S1104).

Note that in the above-described example, the processing when the Block Ack communication are stopped in some of the frequency bands in which the Block Ack communication are in progress has been explained. This method is also applicable to a case in which communication in a further frequency band is the target of Block Ack communication while the Block Ack communication are executed. In this case, a Multi-band field storing information of the frequency band to be added is set in each of the ADDBA Request frame and the ADDBA Response frame. That is, by transmitting/receiving the ADDBA Request frame and the ADDBA Response frame while Block Ack communication are executed, it is possible to add a further frequency band to the Block Ack communication. Note that if contents of the Block Ack communication in progress are changed to continue the Block Ack communication, a frame different from the ADDBA Request/Response frames and the DELBA frame may be used.

As described above, in multi-band communication using a plurality of frequency bands, Block Ack communication can be started/ended by flexibly using each frequency band. That is, which of the plurality of frequency bands is used to execute Block Ack communication can be decided using ADDBA Request and ADDBA Response frames. For example, in the ADDBA Request frame, frequency bands requested to be used for Block Ack communication are designated by two or more Multi-band fields respectively including pieces of information concerning two or more frequency bands. Then, for example, in the ADDBA Response frame, which of the designated frequency bands can be used can be indicated by at least one Multi-band field including information concerning the frequency band. In a DELBA frame, in addition to the end of Block Ack communication in all the frequency bands, it is possible to end Block Ack communication only in some of the frequency bands. For example, if, while Block Ack communication are executed in four frequency bands, the Block Ack communication in two frequency bands are ended, a DELBA frame includes two Multi-Band fields. Note that the start/end of Block Ack communication may be instructed for each radio link/frequency channel, instead of each frequency band. In this case, a Multi-band field may be used or another field may be used. According to this embodiment, in control communication when collectively controlling communication using a plurality of links, it is possible to flexibly set and change a link to be used.

Note that the above-described embodiment has explained the processing of starting/ending Block Ack communication but the present invention is not limited to this. For example, if control communication of collectively controlling communication, other than Block Ack communication, in two or more of a plurality of frequency bands (a plurality of radio links) is executable, the above-described processing is applicable in processing of starting/ending the control. That is, to designate which of a plurality of frequency channels corresponding to the plurality of radio links is to be controlled and which of the frequency channels is not to be controlled, the above-described ADDBA and DELBA frames can be used.

Note that in the above-described embodiment, the communication apparatuses 102 and 103 execute multi-band communication by establishing connections complying with the IEEE 802.11 standard series. However, the present invention is not limited to this. For example, the communication apparatuses 102 and 103 may execute multi-band communication by establishing a plurality of connections complying with a communication standard different from the IEEE 802.11 series standard using different frequency channels (frequency bands). In this case, as described above, it is possible to start and end Block Ack communication in multi-band communication.

Note that each of the above-described processes to be executed by the communication apparatuses 102 and 103 can be implemented when, for example, the control unit 202 of each apparatus executes the program stored in the storage unit 201 but at least part or all of each process may be implemented by hardware. For example, each process can be implemented by hardware by generating, using a predetermined compiler, a dedicated circuit on an FPGA (Field Programmable Gate Array) from a computer program for implementing each processing step. Each process may be implemented by hardware by forming a Gate Array circuit, similar to the case in which the FPGA is used. Each process may be implemented by an ASIC (Application Specific Integrated Circuit).

According to the present invention, it is possible to appropriately execute control communication for collectively controlling communication in a plurality of radio links.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising a communication unit configured to execute communication by establishing connections with another communication apparatus using a plurality of frequency channels, wherein while control communication for collectively controlling communication in the connections using at least two of the plurality of frequency channels is executed, the communication unit transmits or receives a frame for ending the control communication to or from the other communication apparatus, the frame can include at least two fields each storing information concerning a frequency channel, use of which is stopped in the control communication, and in a case where the frame does not include the fields, the control communication is ended in all the plurality of frequency channels.

2. The communication apparatus according to claim 1, wherein the control communication is Block Acknowledgement (Block Ack) communication for collectively transmitting/receiving an acknowledgement for the communication using at least two of the plurality of frequency channels.

3. The communication apparatus according to claim 2, wherein the frame is a DELBA frame complying with an IEEE 802.11 standard series for ending the Block Ack communication, and each field is a Multi-band field.

4. The communication apparatus according to claim 1, wherein information concerning a frequency channel with which the frame is transmitted is not stored in the fields even in a case where the use of the frequency channel is ended in the control communication.

5. The communication apparatus according to claim 1, wherein in a case where the use of not all of the frequency channels used for the control communication is ended and the control communication is continued using the remaining frequency channel, information concerning the frequency channel for which use is to be continued is not stored in the fields.

6. The communication apparatus according to claim 1, wherein the communication unit executes communication complying with an IEEE 802.11be standard.

7. A control method executed by a communication apparatus for executing communication by establishing connections with another communication apparatus using a plurality of frequency channels, comprising:

transmitting or receiving, while control communication for collectively controlling communication in the connections using at least two of the plurality of frequency channels is executed, a frame for ending the control communication to or from the other communication apparatus, wherein the frame can include at least two fields each storing information concerning a frequency channel, use of which is stopped in the control communication, and in a case where the frame does not include the fields, the control communication is ended in all the plurality of frequency channels.

8. A non-transitory computer-readable storage medium that stores a program for causing a computer included in a communication apparatus for executing communication by establishing connections with another communication apparatus using a plurality of frequency channels to:

transmitting or receiving, while control communication for collectively controlling communication in the connections using at least two of the plurality of frequency channels is executed, a frame for ending the control communication to or from the other communication apparatus, wherein the frame can include at least two fields each storing information concerning a frequency channel, use of which is stopped in the control communication, and in a case where the frame does not include the fields, the control communication is ended in all the plurality of frequency channels.

* * * * *